(12) United States Patent
Bardin et al.

(10) Patent No.: US 9,576,475 B2
(45) Date of Patent: Feb. 21, 2017

(54) WIRELESS-ENABLED TENSION METER

(71) Applicant: Southwire Company, LLC, Carrollton, GA (US)

(72) Inventors: Tim R. Bardin, Mesa, AZ (US); Chad Garrish, Gainesville, GA (US); Allan Wayne Daniel, Woodland, AL (US); James Phillip Tuggle, Carrollton, GA (US); Richard Temblador, Carrollton, GA (US)

(73) Assignee: Southwire Company, LLC, Carrollton, GA (US)

(*) Notice: Subject to any disclaimer, the term of this patent is extended or adjusted under 35 U.S.C. 154(b) by 0 days.

(21) Appl. No.: 14/482,033

(22) Filed: Sep. 10, 2014

(65) Prior Publication Data
US 2015/0068318 A1 Mar. 12, 2015

Related U.S. Application Data

(60) Provisional application No. 61/875,926, filed on Sep. 10, 2013.

(51) Int. Cl.
G01N 3/08 (2006.01)
G08C 17/02 (2006.01)
(Continued)

(52) U.S. Cl.
CPC ............ *G08C 17/02* (2013.01); *G01L 5/047* (2013.01); *G01L 5/107* (2013.01); *H04Q 9/00* (2013.01); *H02G 1/08* (2013.01); *H04Q 2209/40* (2013.01)

(58) Field of Classification Search
CPC ........... G01L 5/047; G08C 17/02; H02G 1/08; H04Q 2209/40
(Continued)

(56) References Cited

U.S. PATENT DOCUMENTS 3,759,094 A 9/1973 Al
5,109,707 A 5/1992 VanGerpen
(Continued)

FOREIGN PATENT DOCUMENTS

BR 8601369 12/1986
CN 201133850 10/2008
(Continued)

OTHER PUBLICATIONS

IHS GlobalSpec, "Tension Controller with WiFi Communication," retrieved at http://www.globalspec.com/FeaturedProducts/Detail/DoverFlexo/Tension_Controller_with_WiFi_Communication/222229/0 on Aug. 9, 2013.

Primary Examiner — Max Noori
(74) Attorney, Agent, or Firm — Hartman & Citrin LLC

(57) ABSTRACT

A wireless-enabled tension meter is disclosed. The wireless-enabled tension meter can include a pulley arrangement through which a portion of a guiding member is routed for use during a pull of conductor through a conduit network. A tension force is exerted on the guiding member during the pull as the guiding member is pulled through the pulley arrangement. The wireless-enabled tension meter can also include a sensor for measuring the tension force, a wireless network interface, and a control module for performing operations. The operations performed by the control module can include capturing data corresponding to the tension force and causing the wireless network interface to send the data to a wireless communication device.

37 Claims, 25 Drawing Sheets

(51) Int. Cl.
  *H04Q 9/00* (2006.01)
  *G01L 5/04* (2006.01)
  *G01L 5/10* (2006.01)
  *H02G 1/08* (2006.01)

(58) Field of Classification Search
  USPC .................................................. 73/826, 828
  See application file for complete search history.

(56) References Cited

U.S. PATENT DOCUMENTS

| | | | |
|---|---|---|---|
| 5,224,388 | A | 7/1993 | Pratt |
| 5,235,861 | A | 8/1993 | Seppa |
| 8,754,779 | B2 | 6/2014 | Ruther |
| 2003/0097885 | A1 | 5/2003 | Kell |
| 2003/0128138 | A1 | 7/2003 | Grunder |
| 2007/0012824 | A1 | 1/2007 | Ryser et al. |
| 2007/0228738 | A1* | 10/2007 | Wrage ..................... F03D 5/00 290/44 |
| 2007/0254614 | A1* | 11/2007 | Muralidharan ....... H04W 12/04 455/307 |
| 2010/0269580 | A1 | 10/2010 | Moody et al. |
| 2011/0000317 | A1 | 1/2011 | Ruan |
| 2011/0001627 | A1 | 1/2011 | Ruan |
| 2011/0178731 | A1 | 7/2011 | Munoz Ochovo |
| 2012/0066397 | A1* | 3/2012 | Koch ................. H04L 41/5012 709/226 |
| 2013/0217359 | A1* | 8/2013 | Cherian ................ G06F 15/177 455/411 |
| 2013/0218325 | A1* | 8/2013 | Carlson .................. H02G 1/081 700/213 |

FOREIGN PATENT DOCUMENTS

| | | |
|---|---|---|
| CN | 201145621 | 11/2008 |
| CN | 101655403 | 2/2010 |
| CN | 201600214 | 10/2010 |
| CN | 101915631 | 12/2010 |
| CN | 102118881 | 7/2011 |
| CN | 201935767 | 8/2011 |
| CN | 102173359 | 9/2011 |
| CN | 202033145 | 11/2011 |
| CN | 102288223 | 12/2011 |
| CN | 202141473 | 2/2012 |
| CN | 102445295 | 5/2012 |
| CN | 202609720 | 5/2012 |
| CN | 102486419 | 6/2012 |
| CN | 102494829 | 6/2012 |
| CN | 202329899 | 7/2012 |
| CN | 202382895 | 8/2012 |
| CN | 202485848 | 10/2012 |
| CN | 202511936 | 10/2012 |
| CN | 102867399 | 1/2013 |
| CN | 102923539 | 2/2013 |
| CN | 102980706 | 3/2013 |
| DE | 2727228 | 12/1978 |
| FR | 2 711 425 | 4/1995 |
| RU | 99165 | 11/2010 |
| WO | WO 2005075286 | 8/2005 |
| WO | WO 2013004375 | 1/2013 |

* cited by examiner

WIRELESS-ENABLED TENSION METER

CROSS-REFERENCE TO RELATED APPLICATIONS

This application claims priority to U.S. Provisional Patent Application Ser. No. 61/875,926 filed on Sep. 10, 2013, entitled "Wireless-Enabled Tension Meter," which is expressly incorporated herein by reference in its entirety.

BACKGROUND

The present disclosure is directed to methods and apparatuses for pulling conductors through conduit installations. More particularly, the present disclosure is directed to a wireless-enabled tension meter for measuring tension exerted by a puller system on a guiding member, such as a cable, rope, or wire, used to pull conductors through conduit installations.

During construction of houses, apartment buildings, warehouses, manufacturing facilities, office buildings, and the like, conduit is often run between electrical panels and power consumption sites to comply with various building codes and/or for safety or energy efficiency considerations. After the conduit is installed, a guiding member, such as a cable, rope, wire, or other flexible material, is threaded through the conduit and attached to the end of a number of conductors with tape or other attachment mechanisms. The guiding member is then pulled back through the conduit with the conductors attached thereto. In some practices, the guiding member is manually pulled through the conduit, but in an effort to expedite the process or for larger installations that are infeasible using manpower alone, a puller system ("puller") is often used to pull the guiding member and therefore the conductor through the conduit to a desired location. In addition to the puller, a feeder system ("feeder") is often used to feed the conductors into the conduit to prevent tangling, snagging, and/or damage to the conductors. The feeder may be provided by one or more people or automated by a machine.

The force exerted on the guiding member during a pull is referred to as tension or tension force. It is possible for the magnitude of the tension force to exceed a threshold at which the guiding member breaks, which may result in the conductors being stranded within the conduit installation, and thereby complicating the completion of the pull. Furthermore, pulling conductors and guiding members through conduit creates friction that can wear the conduit, the conductors, and/or the guiding members. The severity of the wear depends upon several factors such as the frictional characteristics of the conductors and guiding members (e.g., lubricated or dry), the layout of the conduit (e.g., the number of bends and the sharpness/radius of the bends), and the speed with which the guiding member and the conductors are pulled through the conduit. Friction, in addition to potentially causing tears or other damage to the conductors and/or the guiding member, results in increased tension on the guiding member, which may result in failure. Failure can be prevented, however, by measuring tension of the guiding member with a running line tension meter and controlling the power to the puller based on the tension measurement.

It is with respect to these and other considerations that the disclosure made herein is presented.

SUMMARY

The present disclosure is directed to a wireless-enabled tension meter. According to various embodiments of the concepts and technologies described herein, a wireless-enabled tension meter can include a pulley arrangement through which a portion of a linear element is routed. A tension force is exerted on the linear element as the linear element traverses through the pulley arrangement. The wireless-enabled tension meter can also include a sensor for measuring the tension force, a wireless network interface, and a control module for performing operations. The operations performed by the control module can include capturing data corresponding to the tension force and causing the wireless network interface to send the data to a wireless communication device.

In some embodiments, the linear element includes a guiding member for use during a pull of conductor through a conduit network. The tension force, in these embodiments, is exerted on the guiding member during the pull as the guiding member traverses the pulley arrangement.

In some embodiments, the device includes a wireless communication device such as a smartphone or tablet. In some other embodiments, the device includes a tension meter remote device.

In some embodiments, the sensor of the wireless-enabled tension meter can include a load pin that functions as an axis for a pulley of the pulley arrangement. The load pin can facilitate measurement of a radial force exerted on the pulley by the guiding member during the pull as the guiding member is pulled through the pulley. The radial force can be utilized to calculate the tension force.

In some embodiments, the wireless network interface of the wireless-enabled tension meter is configured to broadcast a wireless signal that is detectable by the wireless communication device. The wireless signal can include a service set identification ("SSID") unique to the wireless-enabled tension meter. The wireless signal can be a WI-FI signal that is utilized to create a peer-to-peer connection between the wireless network interface and the wireless communication device. Alternatively, in some other embodiments, the wireless signal can be a short-range wireless signal in accordance with a short-range wireless technology, such as, for example, infrared, Infrared Data Association ("IrDA"), BLUETOOTH, wireless Universal Serial Bus ("USB"), Z-Wave, ZIGBEE, near-field communications ("NFC"), or some other short-range wireless technology.

In some embodiments, the control module performs further operations including causing the wireless network interface to connect to a wireless network, which may be a wireless wide area network ("WWAN"), a wireless local area network ("WLAN"), and/or a wireless personal area network component ("WPAN"), for example. The control module can cause the wireless network interface to send the data to the wireless communication device via the wireless network.

In some embodiments, the control module performs further operations including hosting a web application. The web application can include a user interface through which commands can be provided to the wireless-enabled tension meter. The further operations can also include providing the web application to the wireless communication device via the wireless network interface, and receiving a command from the wireless communication device via the wireless network interface. The command can be a selected command presented on the wireless communication device via the user interface. The command can be a request to measure the tension force, a length of the pull, a position of the conductor in the conduit network, and/or a speed of the pull.

According to another aspect of the concepts and technologies disclosed herein, a wireless communication device is disclosed. The wireless communication device can include a display, a network connectivity component, a processor, and a memory component. The memory component can store instructions which, when executed by the processor, cause the processor to perform operations. The operations can include causing the network connectivity component to connect to a wireless-enabled tension meter via a wireless network, receiving data from the wireless-enabled tension meter via the wireless network, and presenting the data on the display.

In some embodiments, the data includes tension data associated with a tension force measured by the wireless-enabled tension meter during a pull of a conductor through a conduit network. The data may be received by the wireless communication device during the pull in real-time, during the pull with some delay, or after the pull. In some embodiments, the data also includes a length of the pull, a position of the conductor in the conduit network, and/or a speed of the pull.

In some embodiments, the operations performed by the processor can also include presenting a user interface on the display, receiving a selection of a command via the display, and sending the command to the wireless-enabled tension meter. The data may be received by the wireless communication device in response to the command being sent to the wireless-enabled tension meter.

In some embodiments, the operations performed by the processor can also include creating a visual representation of the data and presenting the visual representation of the data on the display. The visual representation may include a chart, a graph, and/or a representation of a conduit network through which a conductor is being pulled. In some other embodiments, the operations performed by the processor can also include creating a report of the data and exporting the report.

In some embodiments, the user interface is associated with a native application executed by the processor. In some other embodiments, the user interface is associated with a web application hosted by the wireless-enabled tension meter.

The data may be presented on the display in various formats, such as, for example, text-based formats and visual representation formats (e.g., graphs or charts). In some embodiments, the data is presented on the display in a first format when the wireless communication device is positioned in a first orientation and in a second format when the wireless communication device is positioned in a second orientation. The first orientation may be a landscape orientation and the second orientation may be a portrait orientation.

According to another aspect of the concepts and technologies disclosed herein, a system includes a wireless-enabled tension meter, a wireless communication device in communication with the wireless-enabled tension meter via a wireless network, a puller system, and a guiding member routed through the wireless-enabled tension meter. The puller system can pull the guiding member through the wireless-enabled tension meter thereby exerting a tension force on the guiding member. The wireless-enabled tension meter can measure the tension force exerted on the guiding member by the puller system during a pull and send the tension force to the wireless communication device via the wireless network for presentation on the wireless communication device.

The wireless-enabled tension meter can be suspended on the guide member. Alternatively, the wireless-enabled tension meter can be attached to the puller system. The wireless-enabled tension can be attached to other objects or the ground in some other embodiments.

The wireless-enabled tension meter can measure additional data associated with the pull and send the additional data to the wireless communication device. The additional data can include a length of the pull, a position of a conductor in a conduit network, and/or a speed of the pull.

According to another aspect of the concepts and technologies disclosed herein, a computer storage medium can store computer-executable instructions which, when executed by a processor of a wireless-enabled tension meter, cause the wireless-enabled tension meter to perform operations. The operations can include capturing data from a sensor. The data can correspond to a tension force exerted by a puller system on a guiding member during a pull of conductor through a conduit network. The operations can also include sending the data to a wireless communication device via a wireless network.

In some embodiments, the operations can also include hosting a web application that is accessible by the wireless communication device via the wireless network. The web application can provide a user interface through which a user can control functions of the wireless-enabled tension meter. The functions can include, for example, requesting the wireless-enabled tension meter to capture the data or manipulating data received from the wireless-enabled tension meter. The data can also include a length of the pull, a position of the conductor in the conduit network, and/or a speed of the pull. In addition to or as an alternative to hosting the web application, the wireless-enabled tension meter can rely on a native application executing on the wireless communication device to present the data. In these embodiments, the operation for sending the data to the wireless communication device can include sending the data to the native application executing on the wireless communication device.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods and apparatuses for measuring tension. According to some implementations, tension exerted by a puller system on a guiding member, such as a cable, rope, or wire used to pull conductors through conduit installations is measured using a tension meter. Although the systems, methods, and apparatuses are sometimes described in the aforementioned context, it should be understood that the systems, methods, and apparatuses described herein may additionally or alternatively be used in other contexts in which tension can be measured. For example, the systems, methods, and apparatuses described herein may be used to measure tension exerted on a cable, rope, wire, line, or other linear element used in the operation of a crane or other machinery. As such, the particular implementations described herein should not be construed as being limiting in any way. This description provides various components, one or more of which may be included in particular implementations of the systems and apparatuses disclosed herein. In illustrating and describing these various components, however, it is noted that implementations of the embodiments disclosed herein may include any combination of these components, including combinations other than those shown in this description.

Figure 1A:
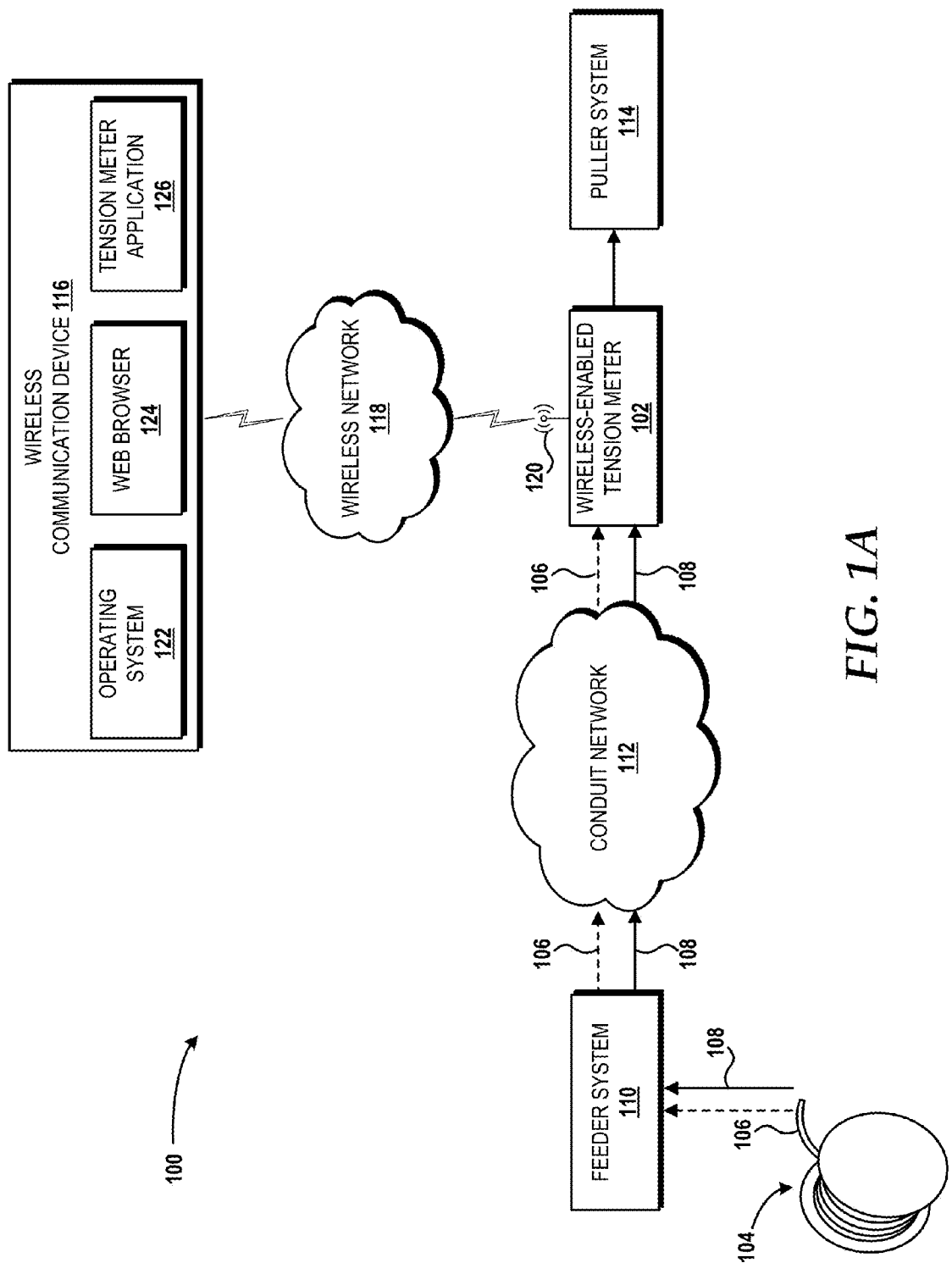
FIGS. 1A-1C are block diagrams illustrating operating environments for a wireless-enabled tension meter, according to several illustrative embodiments.

Turning now to FIG. 1A, an operating environment 100 for a wireless-enabled tension meter 102 will be described in detail in accordance with an illustrative embodiment. In the illustrated operating environment 100, a reel 104 of conductor wire 106 ("conductor" 106), cable, rope, wire, line, or any other linear element is taped, glued, bolted, screwed, or otherwise attached to a guiding member 108, such as a cable, rope, or wire, and fed into a feeder system 110. The feeder system 110 feeds the guiding member 108 attached to the conductor 106 through a conduit network 112. The guiding member 108 is also attached to a puller system 114. The puller system 114 pulls the guiding member 108 attached to the conductor 106 through the conduit network 112. The wireless-enabled tension meter 102 is positioned on the puller system 114 side of the conduit network 112 to measure a tension force exerted by the puller system 114 on the guiding member 108 during a pull of the guiding member 108 through the conduit network 112. In some embodiments, the wireless-enabled tension meter 102 measures additional metrics associated with a pull, including, but not limited to, an elapsed time of the pull, a length of the pull, a speed of the pull, and/or a position of the conductor 106 in the conduit network 112. These and other aspects of the wireless-enabled tension meter 102 will be described below in greater detail.

A "pull" as used herein refers to an operation during which a cable, rope, wire, line, or any other linear element is pulled, manually or via a machine (e.g., the puller system 114). It should be understood that a "pull" may refer more particularly to an operation during which a cable, rope, wire, line, or any other linear element is pulled through a structure such as a conduit.

The feeder system 110 may be any commercially available or proprietary feeder system or otherwise referred to in the art as a "pusher" or "pusher system." The feeder system 110 may be formed from any suitable material, including, but not limited to, steel, aluminum, carbon composite, plastic, or other materials. The feeder system 110 may include hardware components, and in some implementations, may include software and/or firmware components that are utilized, at least in part, to control one or more functions of the feeder system 110. In some embodiments, the feeder system 110 hardware may include, but is not limited to, one or more rollers, one or more drives, one or more guides, one or more pulleys, one or more dividers, one or more height and/or tension adjustment mechanisms, one or more supports, one or more guiding devices, one or more gears, one or more engines, one or more electric motors, one or more cranks, one or more chains, ropes, cables, cords, lines, strings, or the like, and/or other hardware. The software of the feeder system 110, in some embodiments, may include, but is not limited to, applications, routines, subroutines, programs, computer-readable instructions, computer-executable instructions, and the like, for controlling various functions of the feeder system 110 and/or one or more individual hardware components thereof.

The conduit network 112 may include one or more conduits. Each of the conduits may include, but is not limited to, a pipe, a tube, or any other structure containing one or more ducts through which one or more conductors, such as the conductor 106, and/or one or more guiding members, such as the guiding member 108, can be pulled. Each of the conduits may be formed from any suitable material, including, but not limited to, plastic, metal, fiber, clay, or the like. Furthermore, each of the conduits may be flexible or rigid. The conduit network 112 may include a combination of conduits that are formed from different materials and/or with different specifications regarding flexibility and rigidity. The conduit network 112 may be any length and may contain any number of bends, turns, or other layout characteristics. The bends may have known radii. Those skilled in the art will appreciate the vast number of possible configurations of conduit to form a conduit network, and as such, the examples provided herein in this regard should not be construed as being limiting in any way.

The puller system 114 may be any commercially available or proprietary puller system or otherwise referred to in the art as a "puller." The puller system 114 may be formed from any suitable material, including, but not limited to, steel, aluminum, carbon composite, or other materials. The puller system 114 may include hardware components, and in some implementations, may include software and/or firmware components that are utilized, at least in part, to control one or more functions of the puller system 114. In some embodiments, the puller system 114 hardware may include, but is not limited to, one or more rollers, one or more drives, one or more guides, one or more pulleys, one or more dividers, one or more height and/or tension adjustment mechanisms, one or more supports, one or more guiding devices, one or more gears, one or more engines, one or more electric motors, one or more cranks, one or more chains, ropes, cables, cords, lines, strings, or the like, and/or other hardware. The software of the puller system 114, in some embodiments, may include, but is not limited to, applications, routines, subroutines, programs, computer-readable instructions, computer-executable instructions, and the like, for controlling various functions of the puller system 114 and/or one or more individual hardware components thereof.

Although the puller system 114 is shown in the illustrated embodiment, any other system, device, and/or machine that exerts a tension on a cable, rope, wire, line, or any other linear element may be used, and the wireless-enabled tension meter 102 may be used to measure the tension exerted by the other system, device, and/or machine. As such, the illustrated embodiment should not be construed as being limiting in any way.

In some embodiments, the feeder system 110 and/or the puller system 114 are in communication with each other via any wired or wireless communication interface (not shown). The communication interface can be utilized by the feeder system 110 to notify the puller system 114 of a failure or temporary issue with regard to the feeder system 110 so that the puller system 114 can stop a pull to prevent damage to the conductor 106, the guiding member 108, and/or any portion of the conduit network 112. Similarly, the communication interface can be utilized by the puller system 114 to notify the feeder system 110 of a failure or temporary issue with regard to the puller system 114 so that the feeder system 110 can stop feeding the conductor 106 and the guiding member 108 into the conduit network 112. A notification from the feeder system 110 to the puller system 114 or from the puller system 114 to the feeder system 110 may be triggered manually by an individual operating the feeder system 110 or the puller system 114 using a trigger mechanism such as a foot pad, or may be triggered based upon predefined threshold parameters programmed into the software and/or firmware components of the feeder system 110 and/or the puller system 114.

Figure 3:
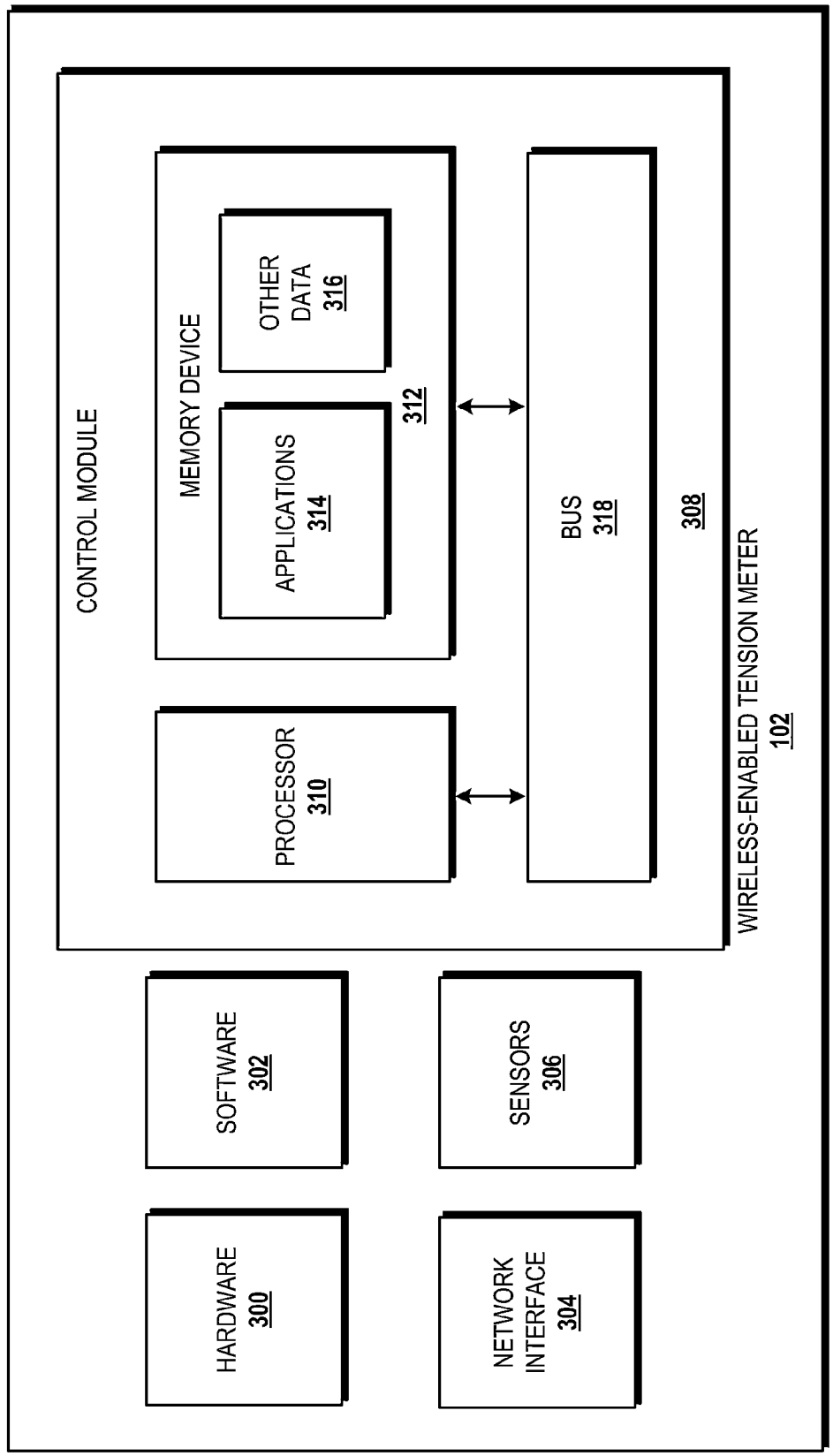
FIG. 3 is a block diagram illustrating a wireless-enabled tension meter and components thereof, according to an illustrative embodiment.

The wireless-enabled tension meter 102 measures the tension force exerted by the puller system 114 on the guiding member 108 during a pull of the guiding member 108 through the conduit network 112. The wireless-enabled tension meter 102 may measure additional metrics associated with a pull, including, but not limited to, an elapsed time of the pull, a length of the pull, a speed of the pull, and/or a position of the conductor 106 in the conduit network 112. The measurements conducted by the wireless-enabled tension meter 102 may be sent to a wireless communication device 116 over a wireless network 118 via a wireless network interface 120. The measurements may be used as-is and/or may be utilized in one or more calculations. For example, the tension force measured by the wireless-enabled tension meter 102 may be used to calculate a sidewall pressure of the conductor 106 during a pull, to provide a minimum sidewall pressure of the conductor 106 during the pull, to provide a maximum sidewall pressure of the conductor 106 during the pull, or some combination thereof. Various components of the wireless-enabled tension meter 102 in accordance with an illustrative embodiment are illustrated in FIG. 3, which is described below in detail.

The wireless network interface 120, in some embodiments, is built-in to the wireless-enabled tension meter 102. In some other embodiments, the wireless network interface 120 is removably connected to the wireless-enabled tension meter 102. The wireless network interface 120 may be or may include a wireless wide area network component ("WWAN component"), a wireless local area network component ("WLAN component"), and/or a wireless personal area network component ("WPAN component") used to facilitate communications to and from the wireless network 118, which may be a WWAN, a WLAN, or a WPAN. Although a single wireless network 118 is illustrated, the wireless network interface 120 may facilitate simultaneous communications with multiple networks. For example, the wireless network interface 120 may facilitate simultaneous communications with multiple networks via one or more of a WWAN, a WLAN, or a WPAN.

The wireless network 118 may be a WWAN, such as a mobile telecommunications network utilizing one or more mobile telecommunications technologies to provide data services to the wireless-enabled tension meter 102 and the wireless communication device 116. In this manner, the wireless network 118 may be broadly construed as including WWANs provided by multiple mobile telecommunications network providers or otherwise known in the art as "wireless carriers." The mobile telecommunications technologies utilized by the wireless network 118 in these embodiments may include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the wireless network 118 in these embodiments may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The wireless network 118 may provide voice and data communications with any combination of the above technologies. The wireless network 118 may be configured to or adapted to provide voice and/or data communications in accordance with future generation technologies.

In some embodiments, the wireless network interface 120 is configured to provide dual-mode or multi-mode connectivity to the wireless network 118. For example, the wireless network interface 120 may provide connectivity to the wireless network 118, wherein the wireless network 118 provides service via GSM and UMTS technologies, or via some other combination of technologies. Alternatively, the wireless-enabled tension meter 102 may include the wireless network interface 120 in addition to at least one further wireless network interface to perform such functionality, and/or provide additional functionality to support other non-compatible technologies (i.e., incapable of being supported by a single wireless network interface). The wireless network interface 118 may facilitate similar connectivity to multiple networks (e.g., a UMTS network and an LTE network).

The wireless network 118 may be a WLAN operating in accordance with one or more Institute of Electrical and Electronic Engineers ("IEEE") 802.11 standards, such as IEEE 802.11a, 802.11b, 802.11g, 802.11n, 802.11ac, 802.11ad, and/or future 802.11 standard (referred to herein collectively as "WI-FI"). Draft 802.11 standards are also contemplated. In some embodiments, the wireless network 118 is implemented utilizing one or more wireless WI-FI access points. In some embodiments, the wireless-enabled tension meter 102 functions as a WI-FI access point. In these embodiments, the wireless network 118 may be a peer-to-peer ("P2P") network between the wireless-enabled tension meter 102 and the wireless communication device 116. The wireless network 118 may be ad-hoc. Connections from the wireless-enabled tension meter 102 to the wireless network 118 and/or connections from the wireless communication device 116 to the wireless network 118 may be secured via various encryption technologies including, but not limited to, WI-FI Protected Access ("WPA"), WPA2, Wired Equivalent Privacy ("WEP"), and the like.

The wireless network 118 may be a WPAN operating in accordance with infrared, Infrared Data Association ("IrDA"), BLUETOOTH, wireless Universal Serial Bus ("USB"), Z-Wave, ZIGBEE, near-field communications ("NFC"), or some other short-range wireless technology.

The wireless-enabled tension meter 102 may send data collected during a pull to the wireless communication device 116 over the wireless network 118 via the wireless network interface 120 in accordance with any of the embodiments described herein above. Moreover, although certain embodiments described above have highlighted certain wireless communication technologies, these embodiments should be construed as being merely illustrative of the possible implementations of wireless communication between the wireless-enabled tension meter 102 and the wireless communication device 116, and as such, should not be construed as being limiting in any way.

The data collected by the wireless-enabled tension meter 102 may be sent to the wireless communication device 116 during a pull or, as also referred to herein, as in "real-time." It will be appreciated by those skilled in the art that the use of "real-time" herein includes the processing of data within milliseconds so that the data is made available virtually immediately after the data is collected. Moreover, the transmission time of data sent by the wireless-enabled tension meter 102 to the wireless communication device 116 over the wireless network 118 may introduce delay. Even including such delays the data sent by the wireless-enabled tension meter 102 to the wireless communication device 116 in some embodiments is considered to be collected in real-time, although delays on the order of seconds or minutes may be considered non-real-time. In some alternative embodiments, data is collected by the wireless-enabled tension meter 102 and sent to the wireless communication device 116 over the wireless network 118 after a pull.

Figure 2:
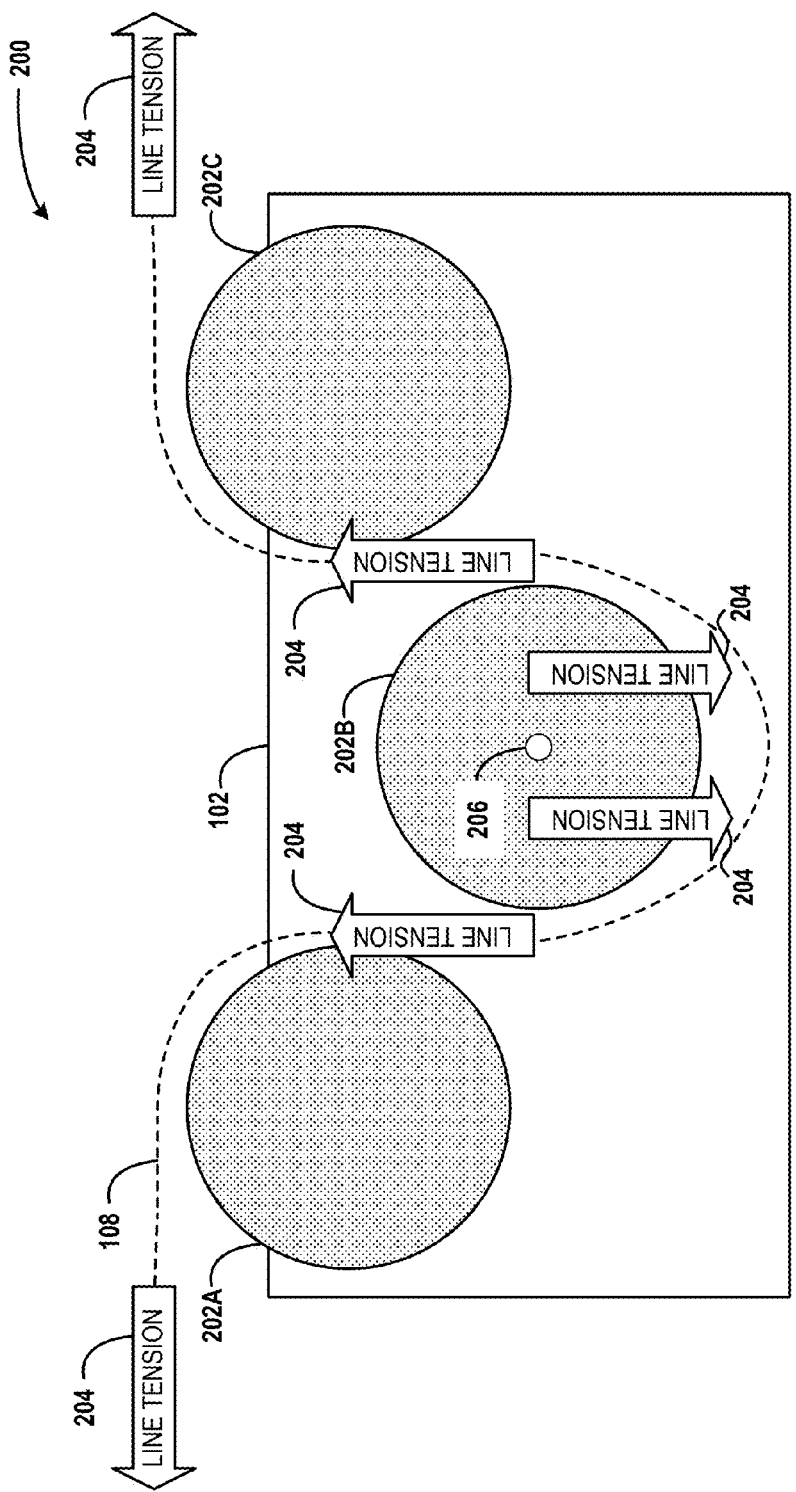
FIG. 2 is a diagram illustrating a portion of a guiding member routed through a wireless-enabled tension meter, according to an illustrative embodiment.
Figure 10:
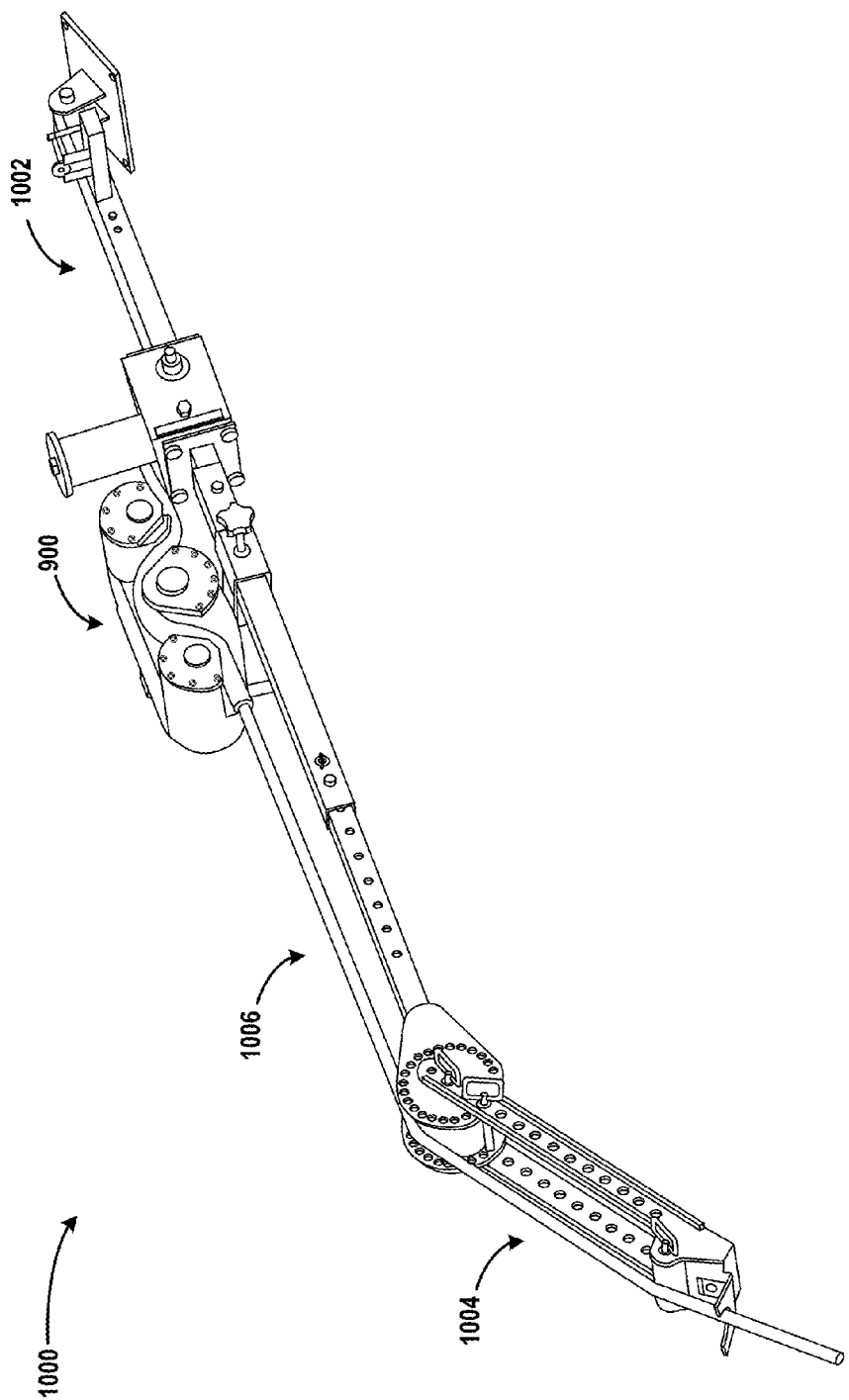
FIG. 10 is a plan drawing illustrating a wireless-enabled tension meter mounted to a puller system, according to an illustrative embodiment.

The guiding member 108 is threaded through the wireless-enabled tension meter 102 and connected to the puller system 114. An example of the guiding member 108 threaded through the wireless-enabled tension meter 102 is illustrated in FIG. 2, which is described below in detail. In some embodiments, the wireless-enabled tension meter 102 is designed to be suspended on the guiding member 108. In some other embodiments, the wireless-enabled tension meter 102 is tied to or otherwise attached to an object or a plurality of objects, the ground, or the puller system 114. An illustrative embodiment of the wireless-enabled tension meter 102 attached to the puller system 114 is illustrated in FIG. 10, which is described below in detail.

Figure 4:
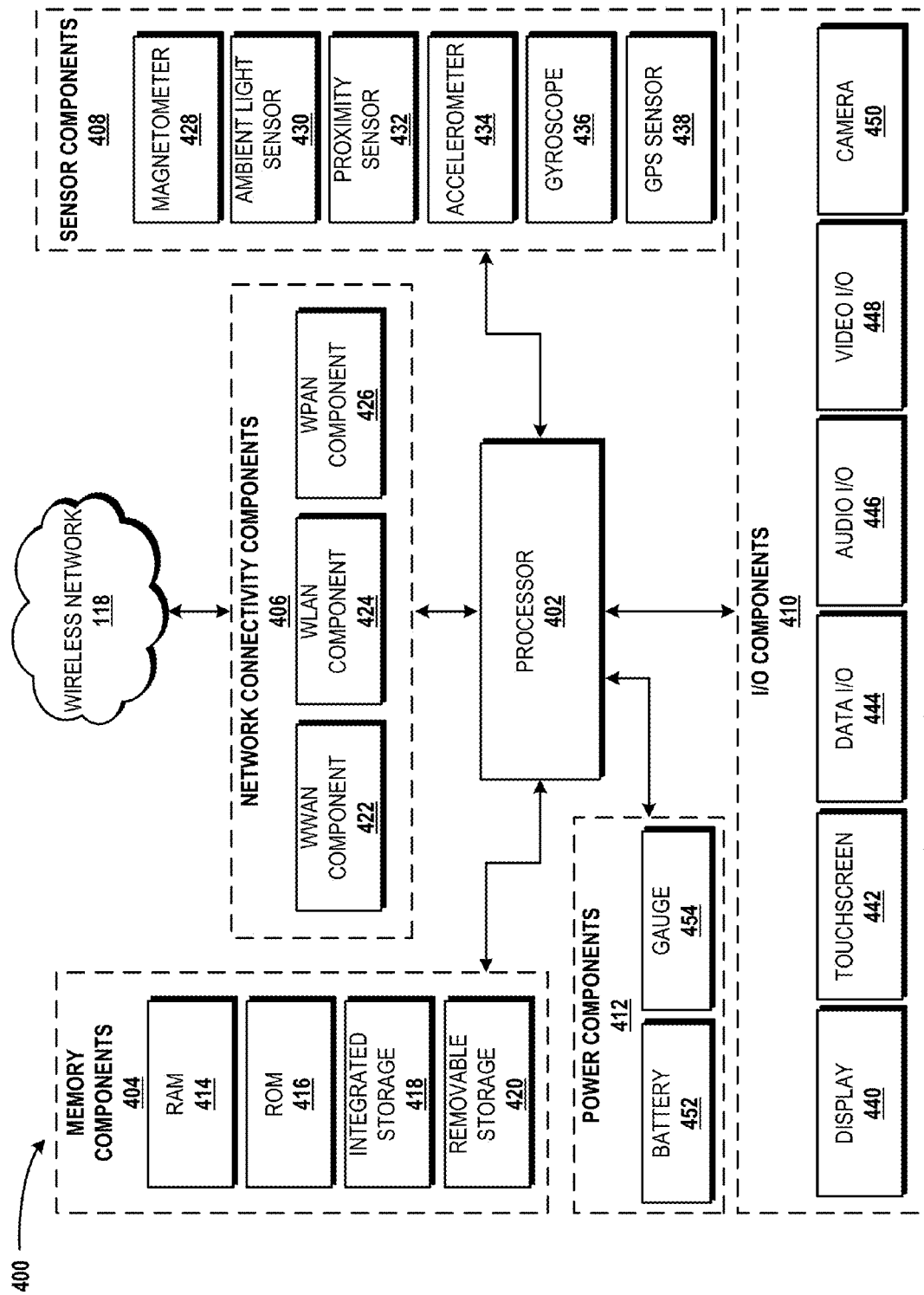
FIG. 4 is a block diagram illustrating a wireless communication device and components thereof, according to an illustrative embodiment.

The wireless communication device 116 may be a mobile telephone, smart phone, tablet device, slate device, portable video game device, desktop computer, portable computer (e.g., laptop, notebook, ultra-portable, netbook, or the like), server computer, or other computing device capable of wireless communication with the wireless-enabled tension meter 102 over the wireless network 118. Various components of the wireless communication device 116 in accordance with an illustrative embodiment are illustrated in FIG. 4, which is described below in detail.

The wireless communication device 116 can execute an operating system 122 and one or more application programs such as, for example, a web browser 124 and a tension meter application 126. The operating system 122 is a computer program for controlling the operation of the wireless communication device 116. The application programs are executable programs configured to execute on top of the operating system 122 to provide various functions.

The web browser 124 is an application program through which a user can access information resources on the World Wide Web ("Web") via one or more networks, including, for example, the wireless network 118 and/or one or more other networks (not shown). The web browser 124 can also facilitate access to information resources residing on the wireless communication device 116. The web browser 124 can also facilitate access to information resources residing on the wireless-enabled tension meter 102. In some embodiments, the web browser 124 facilitates access to information resources residing on the wireless-enabled tension meter 102 via an Internet protocol ("IP") address assigned to the wireless-enabled tension meter 102. The IP address may be translated into a domain name, such as, for example, www-.mytensionmeter.com, or other domain name that may be easily memorized by users. A user may access the wireless-enabled tension meter 102 via the web browser 124 by entering the domain name or IP address associated with the wireless-enabled tension meter 102 into an address bar, search bar, or other user interface element of the web browser 124 that accepts domain names and IP addresses.

As mentioned above, in some embodiments, the wireless-enabled tension meter 102 functions as a WI-FI access point. In these embodiments, the wireless-enabled tension meter 102 may broadcast a service set identifier ("SSID"), and the wireless communication device 116 may detect the SSID of the wireless-enabled tension meter 102, and in response, present a notification to a user of the wireless communication device 116 to notify the user that the wireless-enabled tension meter 102 is within connection range. In some embodiments, the user may navigate through a user interface provided by the operating system 122 to a menu of available SSIDs. The menu of available SSIDs may include, for example, any visible available WI-FI networks and/or WI-FI access points that are within range of the wireless communication device 116. Additionally or alternatively, one or more invisible SSIDs may be available, but for one reason or another (e.g., security) the SSID is not broadcasted. The operating system 122 may provide an SSID entry box to receive input of an SSID that is known to a user but invisible in the menu of available SSIDs. In this manner, the SSID of the wireless-enabled tension meter 102 may be invisible to others who are not privy to utilize the wireless-enabled tension meter 102. After entering the SSID or selecting the SSID associated with the wireless-enabled tension meter 102, the web browser 124 may be launched to a web application associated with the wireless-enabled tension meter 102. The web application may be hosted on the wireless-enabled tension meter 102, such as being built-in to one or more software and/or firmware components of the wireless-enabled tension meter 102.

As also mentioned above, the wireless network 118 may include a WLAN. As such, the wireless network 118 may be associated with an SSID that can be utilized by the wireless-enabled tension meter 102 and the wireless communication device 116 to connect to the wireless network 118 so that the wireless-enabled tension meter 102 can send data to and/or receive input from the wireless communication device 116.

The web browser 124 generally allows the wireless communication device 116 to access web applications associated with the wireless-enabled tension meter 102. In addition to or as an alternative to a web application implementation, interaction between the wireless communication device 116 and the wireless-enabled tension meter 102 can be controlled via the tension meter application 126, which can be a native application installed on the wireless communication device 116. Additional details regarding the tension meter application 126 and the web application are described below in detail with reference to FIGS. 7 and 8A-8D.

Figure 1B:
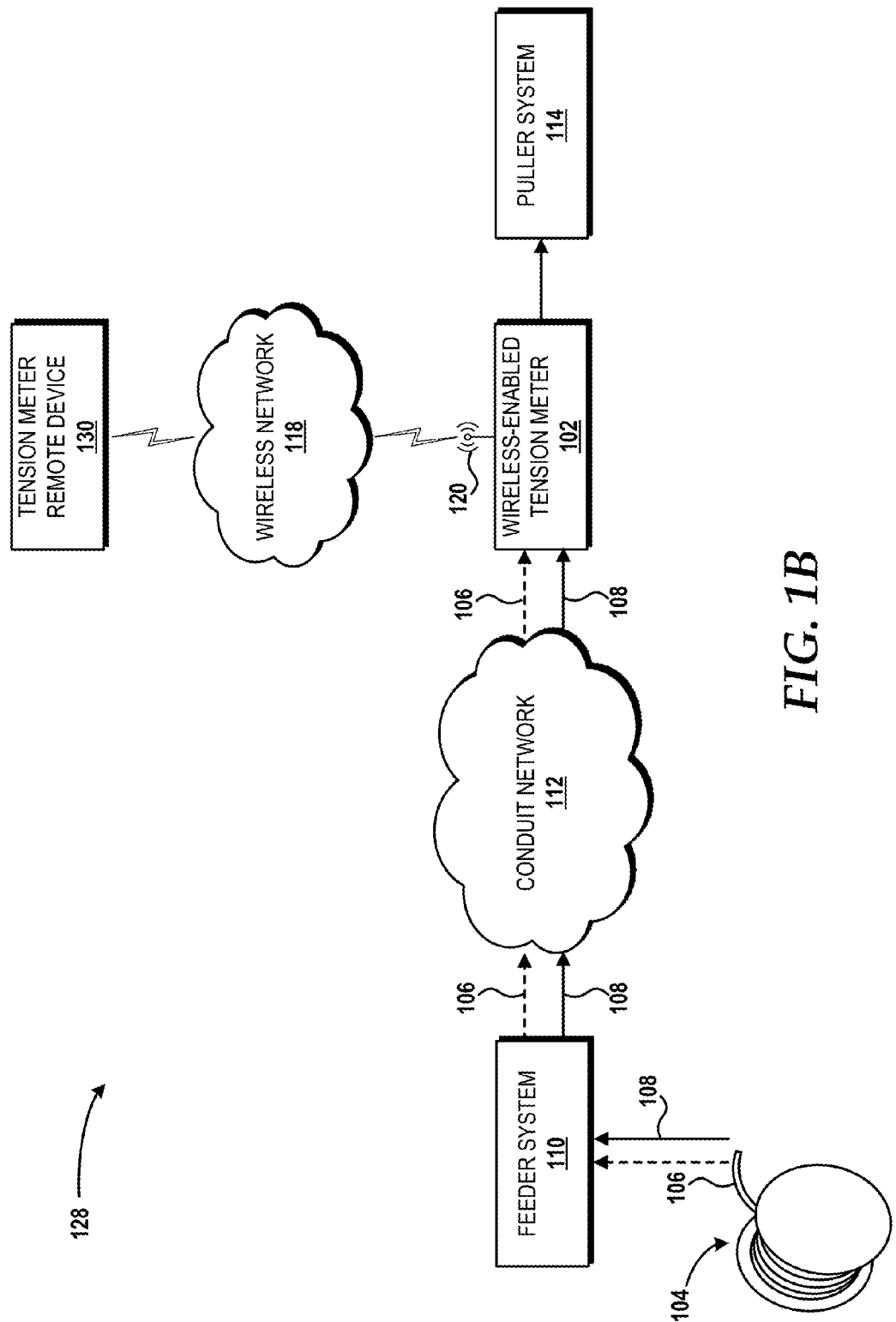

Turning now to FIG. 1B, an alternative operating environment 128 for the wireless-enabled tension meter 102 will be described in detail in accordance with an illustrative embodiment. The alternative operating environment 128 includes all of the elements described above with reference to the operating environment 100 shown in FIG. 1A except for the wireless communication device 116 and the components thereof. The alternative operating environment 128 also includes a tension meter remote device 130. The tension meter remote device 130 may be used to control the operation of the wireless-enabled tension meter 102, receive data from the wireless-enabled tension meter 102, send data to the wireless-enabled tension meter 102, and/or perform other operations such as those described herein above with regard to the wireless communication device 116 illustrated and described with reference to FIG. 1. The tension remote device 130, however, may be provided as part of a system that includes the wireless-enabled tension meter 102 and may be dedicated to the wireless-enabled tension meter 102 or multiple wireless-enabled tension meters 102 (not shown).

In the illustrated embodiment, the tension meter remote device 130 is configured to communicate with the wireless-enabled tension meter 102 via the wireless network 118. The tension meter remote device 130, in some embodiments, functions as a WI-FI access point. In these embodiments, the tension meter remote device 130 may broadcast an SSID, and the wireless-enabled tension meter 102 may detect the SSID of the tension meter remote device 130 and connect to the wireless network 118 provided by the tension meter remote device 130.

Figure 1C:
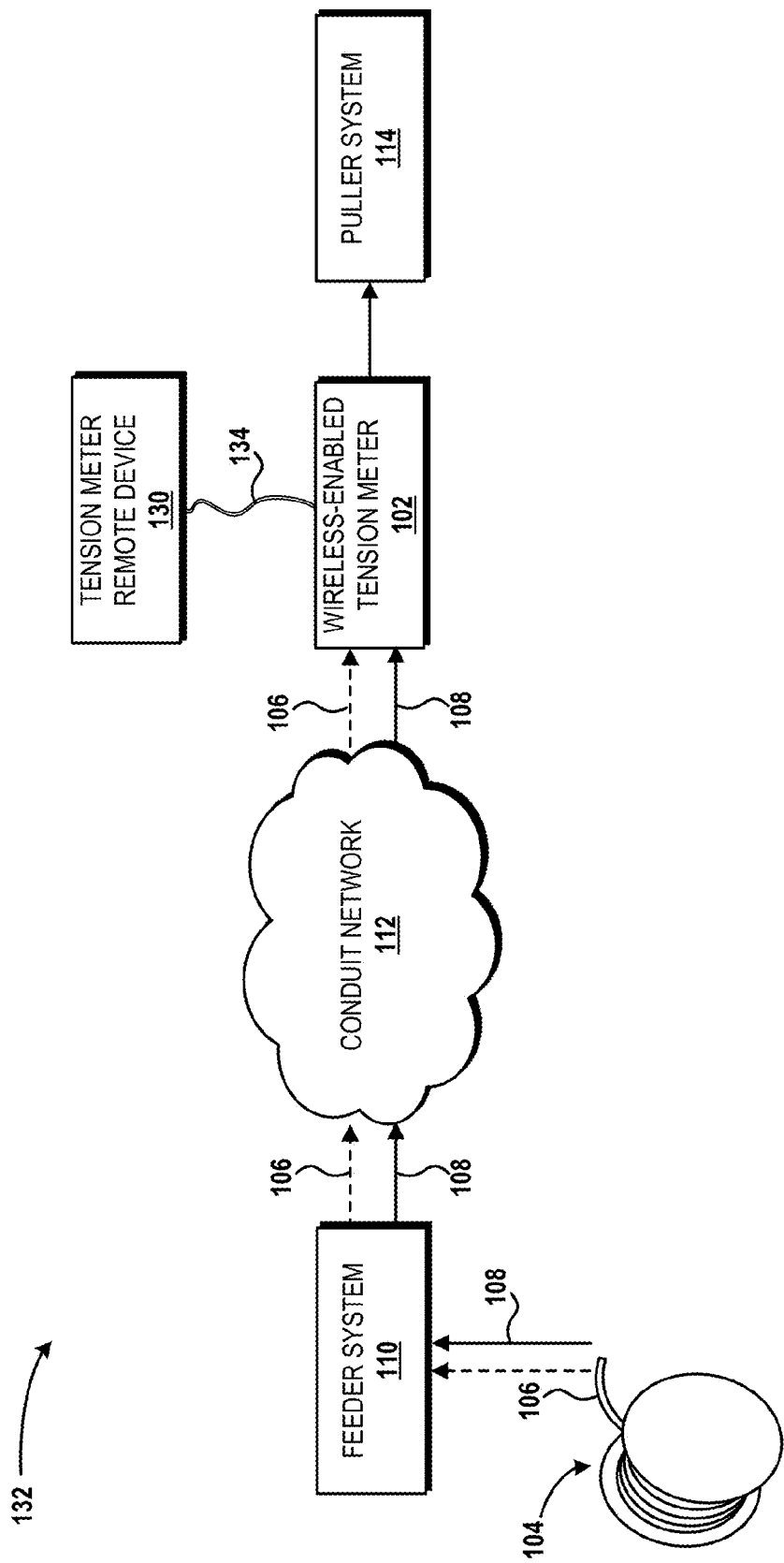

Turning now to FIG. 1C, another alternative operating environment 132 for the wireless-enabled tension meter 102 will be described in detail in accordance with an illustrative embodiment. The other alternative operating environment 132 includes all of the elements described above with reference to the operating environment 100 shown in FIG. 1A except for the wireless communication device 116, the components thereof, the wireless network 118, and the wireless network interface 120. The other alternative operating environment 132 also includes the tension meter remote device 130 introduced in FIG. 1B.

In the illustrated embodiment, the tension meter remote device 130 is tethered to the wireless-enabled tension meter 102 via a tether 134. The tether 134, in some embodiments, is used solely to prevent the tension meter remote device 130 from being misplaced from the wireless-enabled tension meter 102. In some embodiments, the tether 134 facilitates wired communications between the tension meter remote device 130 and the wireless-enabled tension meter 102 absent the wireless network 118. In some embodiments, the tether 134 facilitates wired communications between the tension meter remote device 130 and the wireless-enabled tension meter 102 in addition to wireless connectivity facilitated by the wireless network 118, such as in a backup or redundancy configuration. The tether 134, in some embodiments, facilitates power transfer from the tension meter remote device 130 to the wireless-enabled tension meter 102 or vice versa so as to at least partially provide the power required to operate the tension meter remote device 130 and/or the wireless-enabled tension meter 102. In some embodiments, the tether 134 facilitates both power and communications. It should be understood that although the wireless-enabled tension meter 102 is shown with wireless connectivity such as described above, other tension meters without wireless connectivity may be tethered to the tension meter remote device 130.

Turning now to FIG. 2, an illustrative embodiment of a portion of the guiding member 108 routed through the wireless-enabled tension meter 102 as generally shown at reference number 200 will be described. The illustrated wireless-enabled tension meter 102 includes a first pulley 202A, a second pulley 202B, and a third pulley 202C (collectively or generally referred to herein as "pulleys 202"). Although three pulleys 202 are illustrated, the wireless-enabled tension meter 102 may have more or less than three pulleys 202. Although the pulleys 202 are shown in a fixed configuration, it is contemplated that the pulleys 202 may be adjustable in one or more dimensions, and as such, the illustrated embodiment should not be construed as being limiting in any way. Furthermore, the exact configuration of the pulleys 202 is shown merely as an example, and also should not be construed as being limiting in any way.

As shown, a portion of the guiding member 108 is routed above the first pulley 202A, between the first pulley 202A and the second pulley 202B, under the second pulley 202B, between the second pulley 202B and the third pulley 202C, and over the third pulley 202C. The guiding member 108 routed in this manner results in line tension being exerted on the guiding member 108 as shown generally as line tension 204. The line tension 204 creates a radial force on the second pulley 202B that is approximately equal to twice the line tension 204. A sensor 206 facilitates measurement of the radial force and corresponding line tension (i.e., the line tension 204). The sensor 206, in some embodiments is a load pin that functions as the axis for the second pulley 202B. In some other embodiments, the sensor 206 is a load cell. Other sensor types are contemplated.

In addition to the sensor 206, one or more sensors may be used to measure pulled line length of the guiding member 108 and/or line speed of the guiding member 108 as the guiding member 108 is pulled through the wireless-enabled tension meter 102, for example, by the puller system 114 shown in FIG. 1 and described above in detail. Alternatively, the sensor(s) may collect data that is used to calculate the pulled line length of the guiding member 108 and/or line speed of the guiding member 108.

Turning now to FIG. 3, a block diagram schematically illustrating the wireless-enabled tension meter 102 and components thereof, according to an illustrative embodiment. In the illustrated embodiment, the wireless-enabled tension meter 102 includes one or more hardware components 300 ("hardware"), one or more software components 302 ("software"), one or more network interfaces 304, one or more sensors 306, and one or more control modules 308. The hardware 300 can include hardware components of the wireless-enabled tension meter 102. The hardware 300 can include, but is not limited to, one or more rollers, one or more drives, one or more guides, one or more pulleys, one or more dividers, one or more height and/or tension adjustment mechanisms, one or more supports, one or more guiding devices, one or more gears, one or more engines, one or more electric motors, one or more cranks, one or more chains, ropes, cables, cords, lines, strings, or the like, and/or other hardware. The software 302 can include software components of the wireless-enabled tension meter 102. The software 302 can include, but is not limited to, applications, routines, subroutines, programs, computer-readable instructions, computer-executable instructions, and the like, for controlling various functions of the wireless-enabled tension meter 102.

The network interface 304 can be operatively linked and in communication with one or more communications networks such as, for example, private networks, the Internet, cellular communications networks, wireless area networks, an intranet, other networks, the wireless network 118, combinations thereof, and the like. The network interface 304 can be or can include the wireless network interface 120. The network interface 304 can be used to communicate with other devices and/or networks. It should be understood that the wireless-enabled tension meter 102 can be configured to communicate any desired information to another device via the network interface 304. In some embodiments, the network interface 304 includes a wireless transmitter for communicating with a remote control with which an operator controls the wireless-enabled tension meter 102, the feeder system 110, the puller system 114, and/or a combination thereof. It should be understood that these embodiments are illustrative, and that the remote control can communicate with the wireless-enabled tension meter 102, the feeder system 110, the puller system 114, and/or a combination thereof via hardware other than the network interface 304.

The control module 308 can be used to control the functions of the wireless-enabled tension meter 102. The control module 308 can include one or more processors 310, which can be operatively linked and in communication with one or more memory devices 312 via one or more data/memory busses 318. The processor 310 can execute computer-executable instructions stored in the memory device 312. Execution of the computer-executable instructions can cause the wireless-enabled tension meter 102 to perform various functions, for example, the functionality of the wireless-enabled tension meter 102 described herein. Although the control module 308 is illustrated as a separate entity, with respect to the hardware 300 and the software 302, it should be understood that the functions described with respect to the control module 308 can be performed by the hardware 300 and the software 302. For example, the hardware 300 can include a memory and a processor, and the software 302 can include applications 314 and other data 316 illustrated in the memory device 312. As such, it should be understood that the illustrated configuration is illustrative, and is described in the presented manner for ease of description.

In some embodiments, the tension meter remote device 130 is the control module 308. In some other embodiments, the tension meter remote device 130 includes the control module 308. In these embodiments, the control module 308 is external to the wireless-enabled tension meter 102. Further, in these embodiments, the control module 308 may be tethered to the wireless-enabled tension meter 102 via, for example, the tether 134 (shown in FIG. 1C).

The words "memory device" and "storage device," as used herein collectively include, but are not limited to, processor registers, processor cache, random access memory ("RAM"), other volatile and non-volatile memory devices, semi-permanent or permanent memory types; for example, tape-based media, optical media, flash media, hard disks, combinations thereof, and the like. While the memory device 312 is illustrated as residing proximate to the processor 310, it should be understood that the memory device 312 may be a remotely accessed storage system, for example, a server and/or database on a communications network, a remote hard disk drive, a removable storage medium, a database, a server, an optical media writer, combinations thereof, or the like. In the claims, the phrase "computer storage medium" and variations thereof is intended to encompass devices such as the memory device 312 and other memory components disclosed herein and does not include waves or signals per se and/or communication media such as computer-readable instructions, data structures, program modules, or other data in a modulated data signal such as a carrier wave or other transport mechanism and includes any delivery media.

Moreover, the memory device 312 is intended to encompass network memory and/or other storage devices in wired or wireless communication with the wireless-enabled tension meter 102, which may utilize the network interface 304 to facilitate such communication. Thus, any of the data, applications, and/or software described below can be stored within the memory device 312 and/or accessed via network connections to other data processing systems (not shown) that may include the wireless network 118, the feeder system 110, the puller system 114, the wireless communication device 116, and/or other networks, systems, and/or devices, for example.

The applications 314 can include various programs, routines, subroutines, algorithms, software, tools, and the like ("instructions"), for operating the wireless-enabled tension meter 102; measuring or calculating various metrics, such as, for example, a pulled line length, a pulled line speed, a pulled line position, and a line tension; calibrating various components of the wireless-enabled tension meter 102; tuning one or more components of the wireless-enabled tension meter 102; adjusting the speed of the feeder system 110 and/or the puller system 114; safety applications and controls of the wireless-enabled tension meter 102; reporting and recording/logging modules of the wireless-enabled tension meter 102; and the like, as well as programs or applications to make the wireless-enabled tension meter 102 operable to perform any of the functions described herein. The applications 314 also can include instructions used to operate the wireless-enabled tension meter 102 and/or devices connected to the wireless-enabled tension meter 102, if any. The instructions can include, for example, operating systems, firmware, drivers for peripherals, and the like. The other data 316 can include, for example, pull data and statistics, other programs or software, and the like.

While the above description of the wireless-enabled tension meter 102 has described various forms of computer executable instructions, for example, the software 302 and the applications 314, it should be understood that the software 302 and/or the applications 314 can be omitted or repurposed in various ways, and that the wireless-enabled tension meter 102 can be controlled, at least in part, by one or more hardware controls. In some embodiments, for example, the wireless-enabled tension meter 102 is controlled by one or more switches, levers, or other control devices. These examples are illustrative, and should not be construed as being limiting in any way.

Turning now to FIG. 4, an illustrative architecture 400 for the wireless communication device 116 will be described. In some embodiments, the wireless communication device 116 uses a variation of the architecture 400. As such, the illustrated embodiment of the architecture 400 of the wireless communication device 116 should not be construed as being limiting in any way. In some embodiments, the tension meter remote device 130 may use the architecture 400 or some variation thereof. The architecture 400 illustrated in FIG. 4 includes a processor 402, memory components 404, network connectivity components 406, sensor components 408, input/output components 410, and power components 412, each of which will be described below in detail.

In the illustrated embodiment, the processor 402 is in communication with the memory components 404, the network connectivity components 406, the sensor components 408, the input/output ("I/O") components 410, and the power components 412. Although no connections are shown between the individuals components illustrated in FIG. 4, the components can interact to carry out device functions. In some embodiments, the components are arranged so as to communicate via one or more busses (not shown).

The processor 402 includes a central processing unit ("CPU") configured to process data, execute computer-executable instructions of one or more application programs, and communicate with other components of the architecture 400 in order to perform various functionality described herein. The processor 402 may be utilized to execute aspects of the software components presented herein.

In some embodiments, the processor 402 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some embodiments, the processor 402 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 402 is or is included in a system-on-chip ("SoC") along with one or more of the other components described below. For example, the SoC may include the processor 402, a GPU, one or more of the network connectivity components 406, and one or more of the sensor components 408. In some embodiments, the processor 402 is fabricated, at least in part, utilizing a package-on-package ("PoP") integrated circuit packaging technique. The processor 402 may be a single core or multi-core processor.

The processor 402 may be created in accordance with an ARM architecture, available for license from ARM HOLDINGS of Cambridge, United Kingdom. Alternatively, the processor 402 may be created in accordance with an x86 architecture, such as is available from INTEL CORPORATION of Mountain View, Calif. and others. In some embodiments, the processor 402 is a SNAPDRAGON SoC, available from QUALCOMM of San Diego, Calif.; a TEGRA SoC, available from NVIDIA of Santa Clara, Calif.; a HUMMINGBIRD SoC, available from SAMSUNG of Seoul, South Korea; an Open Multimedia Application Platform ("OMAP") SoC, available from TEXAS INSTRUMENTS of Dallas, Tex.; a customized version of any of the above SoCs; or a proprietary SoC.

The memory components 404 include a RAM 414, a read-only memory ("ROM") 416, an integrated storage memory ("integrated storage") 418, and a removable storage memory ("removable storage") 420. In some embodiments, the RAM 414 or a portion thereof, the ROM 416 or a portion thereof, and/or some combination the RAM 414 and the ROM 416 is integrated with the processor 402. In some embodiments, the ROM 416 is configured to store a firmware, an operating system or a portion thereof (e.g., operating system kernel), and/or a bootloader to load an operating system kernel from the integrated storage 418 and/or the removable storage 420.

The integrated storage 418 can include a solid-state memory, a hard disk, or a combination of solid-state memory and a hard disk. The integrated storage 418 may be soldered or otherwise connected to a logic board upon which the processor 402 and other components described herein also may be connected. As such, the integrated storage 418 is integrated in the wireless communication device 116. The integrated storage 418 is configured to store an operating system or portions thereof, application programs, data, and other software components described herein, such as, but not limited to, the operating system 122, the web browser 124, and/or the tension meter application 126 illustrated in FIG. 1.

The removable storage 420 can include a solid-state memory, a hard disk, or a combination of solid-state memory and a hard disk. In some embodiments, the removable storage 420 is provided in lieu of the integrated storage 418. In other embodiments, the removable storage 420 is provided as additional optional storage. In some embodiments, the removable storage 420 is logically combined with the integrated storage 418 such that the total available storage is made available as a total combined storage capacity. In some embodiments, the total combined capacity of the integrated storage 418 and the removable storage 420 is shown to a user instead of separate storage capacities for the integrated storage 418 and the removable storage 420.

The removable storage 420 is configured to be inserted into a removable storage memory slot (not shown) or other mechanism by which the removable storage 420 is inserted and secured to facilitate a connection over which the removable storage 420 can communicate with other components of the wireless communication device 116, such as the processor 402. The removable storage 420 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like. The removable storage 420 is configured to store an operating system or portions thereof, application programs, data, and other software components described herein, such as, but not limited to, the operating system 122, the web browser 124, and/or the tension meter application 126 illustrated in FIG. 1.

It should be understood that one or more of the memory components 404 can store an operating system, such as the operating system 122. According to various embodiments, the operating system 122 includes, but is not limited to, SYMBIAN OS from SYMBIAN LIMITED; WINDOWS mobile OS from Microsoft Corporation of Redmond, Wash.; WINDOWS phone OS from Microsoft Corporation; WINDOWS from Microsoft Corporation; PALM WEBOS from Hewlett-Packard Company of Palo Alto, Calif.; BLACK-BERRY OS from Research In Motion Limited of Waterloo, Ontario, Canada; IOS from Apple Inc. of Cupertino, Calif.; and ANDROID OS from Google Inc. of Mountain View, Calif. Other operating systems are contemplated.

The network connectivity components 406 include a WWAN component 422, a WLAN component 424, and a WPAN component 426. The network connectivity components 406 facilitate communications to and from networks, such as the wireless network 118 and/or one or more other networks, which may be WWANs, WLANs, WPANs, or some combination thereof. Although only the network 118 is illustrated, the network connectivity components 406 may facilitate simultaneous communication with multiple networks. For example, the network connectivity components 406 may facilitate simultaneous communications with multiple networks via one or more of a WWAN, a WLAN, or a WPAN.

In some embodiments, the WWAN component 422 is configured to provide dual-mode or multi-mode connectivity to the wireless network 118 and/or one or more other networks. For example, the WWAN component 422 may be configured to provide connectivity to the wireless network 118, wherein the wireless network 118 provides service via GSM and UMTS technologies, or via some other combination of technologies. Alternatively, multiple WWAN components 422 may be utilized to perform such functionality, and/or provide additional functionality to support other non-compatible technologies (i.e., incapable of being supported by a single WWAN component). The WWAN component 422 may facilitate similar connectivity to multiple networks (e.g., a UMTS network and an LTE network).

The sensor components 408 include a magnetometer 428, an ambient light sensor 430, a proximity sensor 432, an accelerometer 434, a gyroscope 436, and a Global Positioning System sensor ("GPS sensor") 438. It is contemplated that other sensors, such as, but not limited to, temperature sensors or shock detection sensors, also may be incorporated in the architecture 400.

The magnetometer 428 is configured to measure the strength and direction of a magnetic field. In some embodiments the magnetometer 428 provides measurements to a compass application program stored within one of the memory components 404 in order to provide a user with accurate directions in a frame of reference including the cardinal directions, north, south, east, and west. Similar measurements may be provided to a navigation application program that includes a compass component. Other uses of measurements obtained by the magnetometer 428 are contemplated.

The ambient light sensor 430 is configured to measure ambient light. In some embodiments, the ambient light sensor 430 provides measurements to an application program stored within one the memory components 404 in order to automatically adjust the brightness of a display (described below) to compensate for low-light and high-light environments. Other uses of measurements obtained by the ambient light sensor 430 are contemplated.

The proximity sensor 432 is configured to detect the presence of an object or thing in proximity to the wireless communication device 116 without direct contact. In some embodiments, the proximity sensor 432 detects the presence of a user's body (e.g., the user's face) and provides this information to an application program stored within one of the memory components 404 that utilizes the proximity information to enable or disable some functionality of the wireless communication device 116. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 432 are contemplated.

The accelerometer 434 is configured to measure proper acceleration. In some embodiments, output from the accelerometer 434 is used by an application program as an input mechanism to control some functionality of the application program. For example, the application program may be a video game in which a character, a portion thereof, or an object is moved or otherwise manipulated in response to input received via the accelerometer 434. In some embodiments, output from the accelerometer 434 is provided to an application program for use in switching between landscape and portrait modes, calculating coordinate acceleration, or detecting a fall. Other uses of the accelerometer 434 are contemplated.

The gyroscope 436 is configured to measure and maintain orientation. In some embodiments, output from the gyroscope 436 is used by an application program as an input mechanism to control some functionality of the application program. For example, the gyroscope 436 can be used for accurate recognition of movement within a 3D environment of a video game application or some other application. In some embodiments, an application program utilizes output from the gyroscope 436 and the accelerometer 434 to enhance control of some functionality of the application program. Other uses of the gyroscope 436 are contemplated.

The GPS sensor 438 is configured to receive signals from GPS satellites for use in calculating a location. The location calculated by the GPS sensor 438 may be used by any application program that requires or benefits from location information. For example, the location calculated by the GPS sensor 438 may be used with a navigation application program to provide directions from the location to a destination or directions from the destination to the location. Moreover, the GPS sensor 438 may be used to provide location information to an external location-based service, such as E911 service. The GPS sensor 438 may obtain location information generated via WI-FI, WIMAX, and/or cellular triangulation techniques utilizing one or more of the network connectivity components 406 to aid the GPS sensor 438 in obtaining a location fix. The GPS sensor 438 may also be used in Assisted GPS ("A-GPS") systems.

The I/O components 410 include a display 440, a touchscreen 442, a data I/O interface component ("data I/O") 444, an audio I/O interface component ("audio I/O") 446, a video I/O interface component ("video I/O") 448, and a camera 450. In some embodiments, the display 440 and the touchscreen 442 are combined. In some embodiments, two or more of the data I/O component 444, the audio I/O component 446, and the video I/O component 448 are combined. The I/O components 410 may include discrete processors configured to support the various interfaces described below, or may include processing functionality built-in to the processor 402.

The display 440 is an output device configured to present information in a visual form. In particular, the display 440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 440 is a liquid crystal display ("LCD") utilizing any active or passive matrix technology and any backlighting technology (if used). In some embodiments, the display 440 is an organic light emitting diode ("OLED") display. Other display types are contemplated.

The touchscreen 442 is an input device configured to detect the presence and location of a touch. The touchscreen 442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 442 is incorporated on top of the display 440 as a transparent layer to enable a user to use one or more touches to interact with objects or other information presented on the display 440. In other embodiments, the touchscreen 442 is a touch pad incorporated on a surface of the wireless communication device 116 that does not include the display 440. For example, the wireless communication device 116 may have a touchscreen incorporated on top of the display 440 and a touch pad on a surface opposite the display 440.

In some embodiments, the touchscreen 442 is a single-touch touchscreen. In other embodiments, the touchscreen 442 is a multi-touch touchscreen. In some embodiments, the touchscreen 442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 442. As such, a developer may create gestures that are specific to a particular application program, such as the operating system 122, the web browser 124, and/or the tension meter application 126 illustrated in FIG. 1.

In some embodiments, the touchscreen 442 supports a tap gesture in which a user taps the touchscreen 442 once on an item presented on the display 440. The tap gesture may be used for various reasons including, but not limited to, opening, launching, waking up, or otherwise interacting with an application program or function thereof that is associated with the GUI element that the user taps. In some embodiments, the touchscreen 442 supports a double tap gesture in which a user taps the touchscreen 442 twice on an item to perform some function. The double tap gesture may be used for various reasons including, but not limited to, zooming in or zooming out in stages. In some embodiments, the touchscreen 442 supports a tap and hold gesture in which a user taps the touchscreen 442 and maintains contact for at least a pre-defined time. The tap and hold gesture may be used for various reasons including, but not limited to, opening a context-specific menu.

In some embodiments, the touchscreen 442 supports a pan gesture in which a user places a finger on the touchscreen 442 and maintains contact with the touchscreen 442 while moving the finger on the touchscreen 442. The pan gesture may be used for various reasons including, but not limited to, moving through screens, images, or menus at a controlled rate. Multiple finger pan gestures are also contemplated. In some embodiments, the touchscreen 442 supports a flick gesture in which a user swipes a finger in the direction the user wants the screen to move. The flick gesture may be used for various reasons including, but not limited to, scrolling horizontally or vertically through menus or pages. In some embodiments, the touchscreen 442 supports a pinch and stretch gesture in which a user makes a pinching motion with two fingers (e.g., thumb and forefinger) on the touchscreen 442 or moves the two fingers apart. The pinch and stretch gesture may be used for various reasons including, but not limited to, zooming gradually in or out of a website, map, graph, chart, or picture, for example.

Although the above gestures have been described with reference to the use of one or more fingers for performing the gestures, other appendages such as toes or objects such as styluses may be used to interact with the touchscreen 442. As such, the above gestures should be understood as being illustrative, and should not be construed as being limiting in any way.

The data I/O interface component 444 is configured to facilitate input of data (e.g., via a keyboard, keypad, or other input device) to the wireless communication device 116 and output of data from the wireless communication device 116. In some embodiments, the data I/O interface component 444 includes a connector configured to provide wired connectivity between the wireless communication device 116 and a computer system, for example, for synchronization operation purposes. The connector may be a proprietary connector or a standardized connector such as USB, micro-USB, mini-USB, or the like. In some embodiments, the connector is a dock connector for docking the wireless communication device 116 with another device such as a docking station, audio device (e.g., a digital music player), or video device.

The audio I/O interface component 446 is configured to provide audio input and/or output capabilities to the wireless communication device 116. In some embodiments, the audio I/O interface component 446 includes a microphone configured to collect audio signals. In some embodiments, the audio I/O interface component 446 includes a headphone jack configured to provide connectivity for headphones or other external speakers. In some embodiments, the audio I/O interface component 446 includes a speaker for the output of audio signals. In some embodiments, the audio I/O interface component 446 includes an optical audio cable out.

The video I/O interface component 448 is configured to provide video input and/or output capabilities to the wireless communication device 116. In some embodiments, the video I/O interface component 448 includes a video connector configured to receive video as input from another device (e.g., a video media player such as a DVD or BLURAY player) or send video as output to another device (e.g., a monitor, a television, or some other external display). In some embodiments, the video I/O interface component 448 includes a High-Definition Multimedia Interface ("HDMI"), mini-HDMI, micro-HDMI, DisplayPort, or proprietary connector to input/output video content. In some embodiments, the video I/O interface component 448 or portions thereof is combined with the audio I/O interface component 446 or portions thereof The camera 450 can be configured to capture still images and/or video. The camera 450 may utilize a charge coupled device ("CCD") or a complementary metal oxide semiconductor ("CMOS") image sensor to capture images. In some embodiments, the camera 450 includes a flash to aid in taking pictures in low-light environments. Settings for the camera 450 may be implemented as hardware or software buttons.

Although not illustrated, one or more hardware buttons may also be included in the architecture 400. The hardware buttons may be used for controlling some operational aspect of the wireless communication device 116 such as powering on/off or resetting the wireless communication device 116.

The hardware buttons may be dedicated buttons or multi-use buttons. The hardware buttons may be mechanical or sensor-based.

The illustrated power components 412 include one or more batteries 452, which can be connected to a battery gauge 454. The batteries 452 may be rechargeable or disposable. Rechargeable battery types include, but are not limited to, lithium polymer, lithium ion, nickel cadmium, and nickel metal hydride. Each of the batteries 452 may be made of one or more cells.

The battery gauge 454 can be configured to measure battery parameters such as current, voltage, and temperature. In some embodiments, the battery gauge 454 is configured to measure the effect of a battery's discharge rate, temperature, age and other factors to predict remaining life within a certain percentage of error. In some embodiments, the battery gauge 454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 412 may also include a power connector, which may be combined with one or more of the aforementioned I/O components 410. The power components 412 may interface with an external power system or charging equipment via a power I/O component (not shown).

Figure 5:
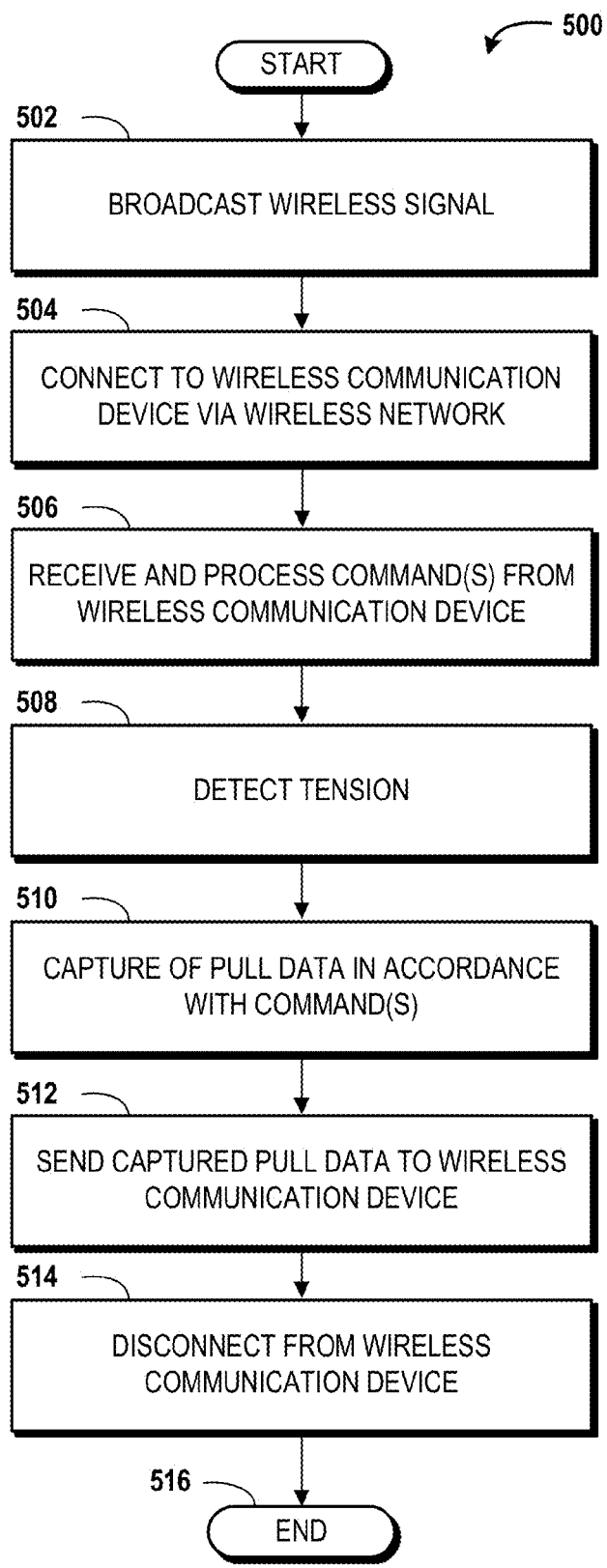
FIG. 5 is a flow diagram illustrating a method of operation for a wireless-enabled tension meter to provide data associated with a pull to a wireless communication device, according to an illustrative embodiment.

Turning now to FIG. 5, aspects of a method 500 of operation for the wireless-enabled tension meter 102 to provide data associated with a pull to the wireless communication device 116 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-executable instructions included on a computer storage medium, as defined herein. The term "computer-executable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 500 begins at operation 502, where the wireless-enabled tension meter 102 broadcasts a wireless signal that is detectable by the wireless communication device 116. The wireless signal may be any signal included within the wireless network 118 or itself may be the wireless network 118. In some embodiments, the wireless signal may be infrared, IrDA, BLUETOOTH, wireless USB, Z-Wave, ZIGBEE, NFC, or other short-range wireless signal. Alternatively, in some other embodiments, the wireless signal may be a WI-FI signal that includes a broadcast of an SSID associated with the wireless-enabled tension meter 102. The wireless signal may also generally facilitate connection of the wireless-enabled tension meter 102 to the wireless network 118, wherein the wireless network 118 is a WLAN (e.g, implemented via WI-FI), WPAN, WWAN, or some combination thereof.

From operation 502, the method 500 proceeds to operation 504, where the wireless-enabled tension meter 102 connects to the wireless communication device 116 via the wireless network 118. It should be understood that in some embodiments, the wireless-enabled tension meter 102 does not broadcast a wireless signal and the connection between the wireless communication device 116 and the wireless-enabled tension meter 102 is initiated by the wireless communication device 116, and may be triggered by a proximity of the wireless communication device 116 to the wireless-enabled tension meter 102 or by some other stimulus.

From operation 504, the method 500 proceeds to operation 506, where the wireless-enabled tension meter 102 receives and processes one or more commands from the wireless communication device 116. The commands received from the wireless communication device 116 may include, but are not limited to, commands to measure one or more metrics such as length, tension, and/or speed during a pull, commands regarding the selection of real-time or delayed measurement, commands regarding data logging, and/or other commands to instruct the wireless-enabled tension meter 102 to perform a function. Some illustrative commands and a user interface through which one or more users may provide the commands to the wireless-enabled tension meter 102 are described below with reference to FIG. 7.

From operation 506, the method 500 proceeds to operation 508, where the wireless-enabled tension meter 102 detects tension. For example, as described above with respect to FIGS. 2 and 3, the wireless-enabled tension meter 102 may include one or more sensors that calculate the speed of movement of the guiding member 108 through the wireless-enabled tension meter 102, and these sensors may be utilized to detect tension, for example, when a pull is initiated with any directional movement (e.g., towards the puller system 114) of the guiding member 108 through the wireless-enabled tension meter 102.

From operation 508, the method 500 proceeds to operation 510, where the wireless-enabled tension meter 102 captures data associated with the pull ("pull data") in accordance with the command(s) received at operation 506. For example, the commands received at operation 506 may instruct the wireless-enabled tension meter 102 to measure the tension, length, and/or speed during the pull, and the wireless-enabled tension meter 102 measures the requested metrics during the capture operation 510. As noted above, the wireless-enabled tension meter 102 may capture data via one or more sensors and the data may be later used to calculate the tension, the speed, and/or the length, for example, by the hardware 300 or the processor 310 (shown in FIG. 3) by execution of one or more of the applications 314 (also shown in FIG. 3). Alternatively, metrics such as tension, speed, and/or length may be measured or calculated directly via one or more sensors of the wireless-enabled tension meter 102.

From operation 510, the method 500 proceeds to operation 512, where the wireless-enabled tension meter 102 sends the captured pull data to the wireless communication device 116 over the wireless network 118 via the wireless network interface 120. In some embodiments, the wireless-enabled tension meter 102 sends the captured pull data unformatted to the wireless communication device 116 so that the wireless communication device 116, and more particularly, the tension meter application 126 can format the captured pull data in various ways, including, for example, creating one or more graphs, charts, or other visual or text representations of the data. The data can also be analyzed to calculate values such as maximum tension, minimum tension, average tension, maximum speed, minimum speed, average speed, pull length, pull midpoint, and the like. The wireless-enabled tension meter 102, in some other embodiments, can format the data via execution of one or more applications, such as the applications 314, and send the formatted data to the wireless communication device 116 or make available the formatted data via a web application interface that is accessible by the wireless communication device 116 via the web browser 124.

From operation 512, the method 500 proceeds to operation 514, where the wireless-enabled tension meter 102 disconnects from the wireless communication device 116. The operation 514 may be initiated by the wireless communication device 116 or the wireless-enabled tension meter 102.

From operation 514, the method 500 proceeds to operation 516. The method 500 ends at operation 516.

Figure 6:
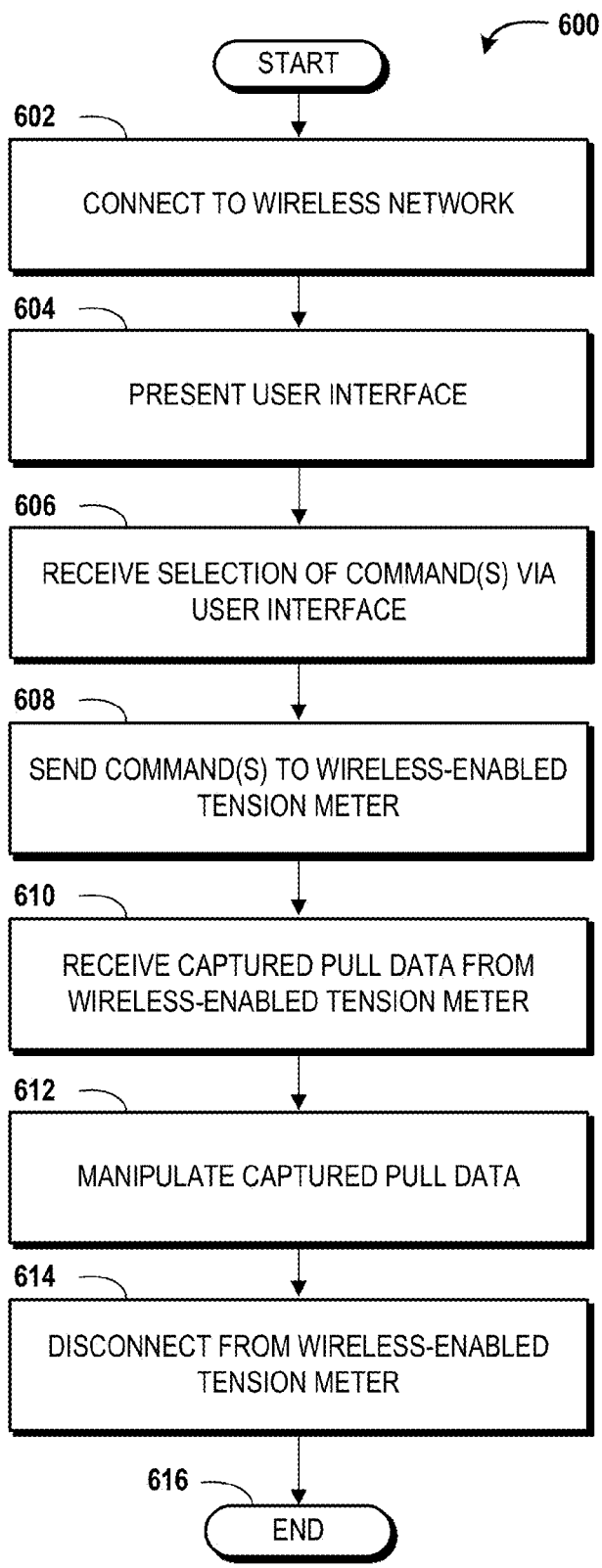
FIG. 6 is a flow diagram illustrating a method of operation for a wireless communication device to receive and process data associated with a pull, according to an illustrative embodiment.

Turning now to FIG. 6, aspects of a method 600 of operation for the wireless communication device 116 to receive and process data associated with a pull will be described, according to an illustrative embodiment. The method 600 begins and proceeds to operation 602, where the wireless communication device 116 connects to the wireless network 118. From operation 602, the method 600 proceeds to operation 604, where the wireless communication device 116 presents a user interface. The user interface may provide one or more user interface elements through which one or more users can interact with the wireless-enabled tension meter 102. For example, the user interface may allow one or more users to issue commands to the wireless-enabled tension meter 102 to instruct the wireless-enabled tension meter 102 to measure one or more metrics such as length, tension, and/or speed during a pull, select real-time or delayed measurement, to log pull data, and/or to instruct the wireless-enabled tension meter 102 to perform one or more other functions. Several illustrative user interfaces are described below with reference to FIGS. 7, 8A, and 8B.

From operation 604, the method 600 proceeds to operation 606, where the wireless communication device 116 receives a selection of one or more commands via the user interface. It should be understood that the one or more commands may be selected sequentially or simultaneously using any of the input interfaces described above for the wireless communication device 116, including, for example, the sensor components 408 and/or the I/O components 410 described above with reference to FIG. 4. From operation 606, the method 600 proceeds to operation 608, where the wireless communication device 116 sends the command(s) selected at operation 606 to the wireless-enabled tension meter 102. The commands(s) may be sent by the wireless communication device 116 to the wireless-enabled tension meter 102 sequentially or simultaneously.

From operation 608, the method 600 proceeds to operation 610, where the wireless communication device 116 receives captured pull data from the wireless-enabled tension meter 102. From operation 610, the method 600 proceeds to operation 612, where the wireless communication device 116 optionally manipulates the captured pull data. The captured pull data can be manipulated in various ways including, for example, to create one or more text representations or visual representations such as graphs, charts, or the like. The captured pull data can be used to create a report, which may be emailed, converted into different formats (e.g., portable document format and the like), and/or presented locally on the wireless communication device 116.

From operation 612, the method 600 proceeds to operation 614, where the wireless-enabled tension meter 102 disconnects from the wireless-enabled tension meter 102. The operation 614 may be initiated by the wireless communication device 116 or the wireless-enabled tension meter 102.

From operation 614, the method 600 proceeds to operation 616. The method 600 ends at operation 616.

Figure 7:
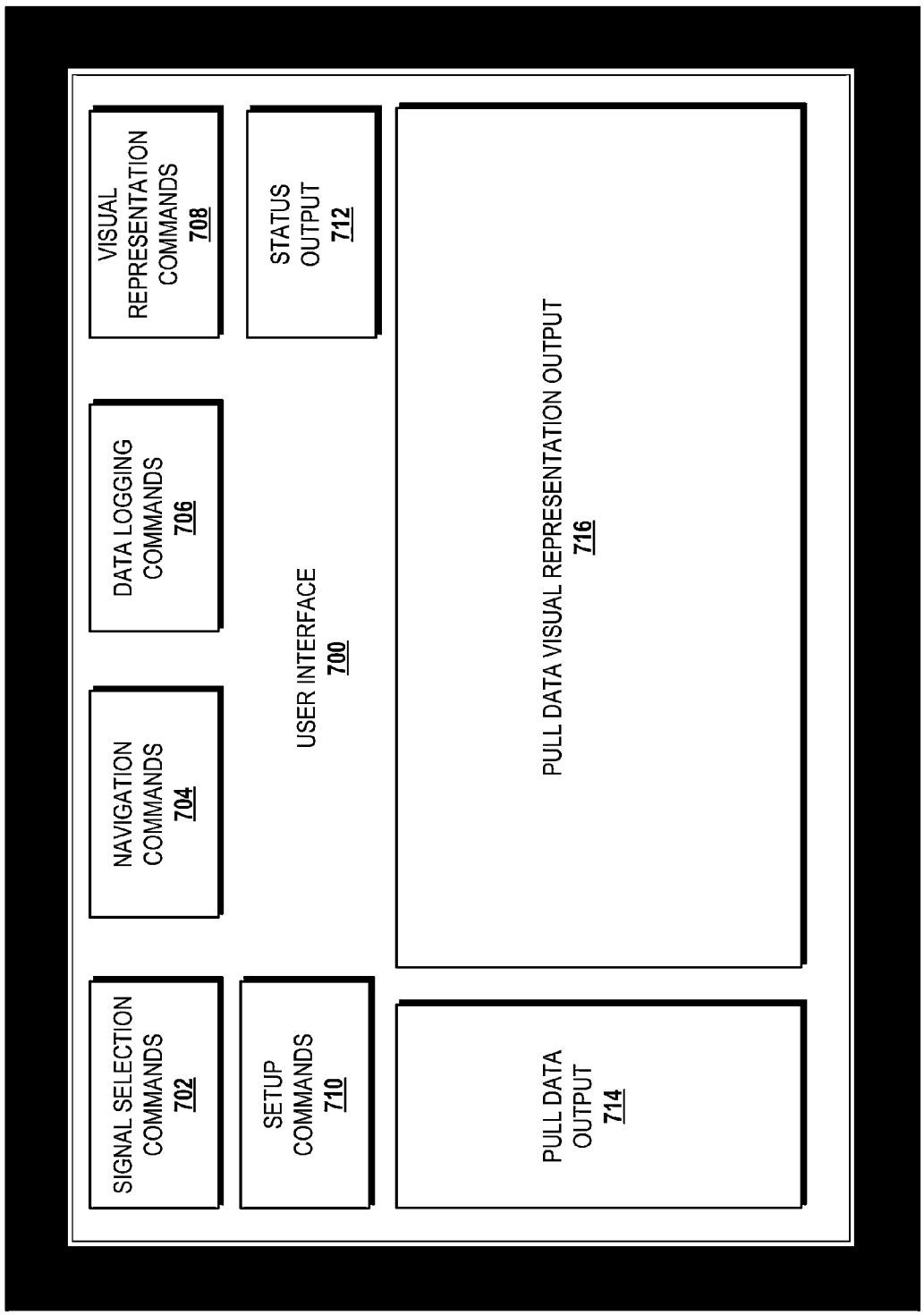
FIG. 7 is a user interface diagram illustrating aspects of a user interface for a tension meter application, according to an illustrative embodiment.
Figure 12A:
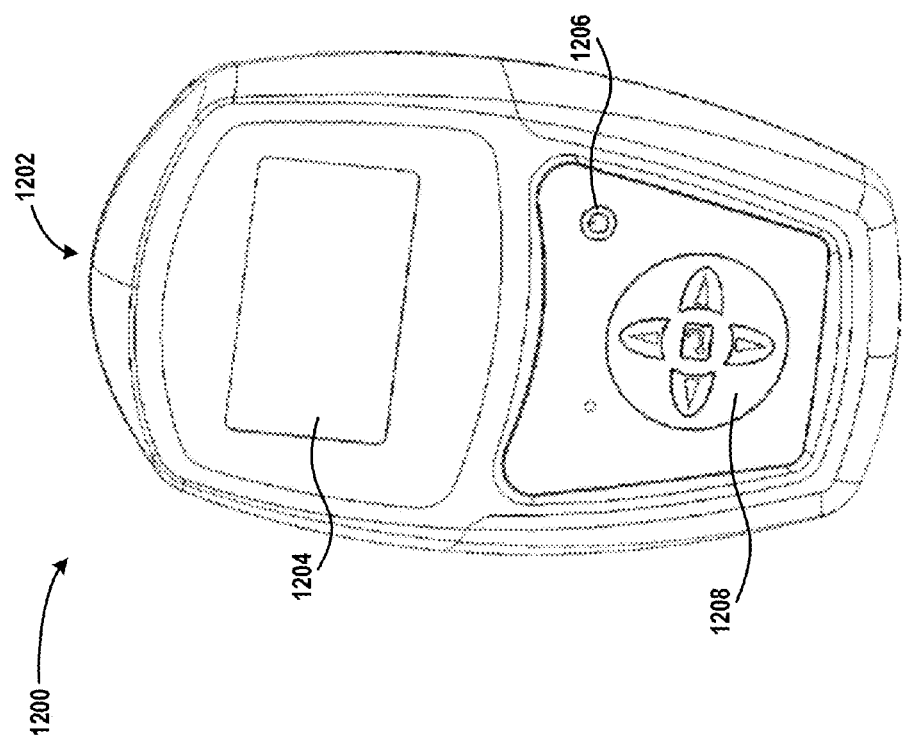
FIGS. 12A-12B are plan drawings illustrating a wireless tension meter remote device, according to an illustrative embodiment.

Turning now to FIG. 7, a user interface diagram illustrating aspects of a user interface 700 for a tension meter application such as the tension meter application 126 and/or a web application accessible via the web browser 124 will be described, according to an illustrative embodiment. The user interface 700 may be presented on a display of the wireless communication device 116 and/or a display of the tension meter remote device 130. An example display of the tension meter remote device 130 is illustrated in FIG. 12A.

The illustrated user interface 700 includes signal collection commands 702, navigation commands 704, data logging commands 706, visual representation commands 708, setup commands 710, a status output element 712, a pull data output element 714, and a pull data visual representation 716. The user interface 700 may include additional, fewer or alternative user interface elements than those illustrated in FIG. 7 and now described.

The user interface 700 is shown on the wireless communication device 116 embodied as a tablet device, such as, for example, an iPAD®, from Apple Inc. of Cupertino, Calif. It should be understood that the user interface 700 may be modified for compatibility with other form factors, including, but not limited to, desktop and laptop computers, mobile telephones such as smart phones, and one or more displays on and/or associated with the wireless-enabled tension meter 102. It also should be understood that although the user interface 700 is shown in a landscape orientation, the user interface 700 may provide the same, additional, or alternative functions when placed in a portrait orientation. Movement of the wireless communication device 116 from a landscape orientation to a portrait orientation may be detected, at least in part, by the accelerometer 434 and/or the gyroscope 436 of the wireless communication device 116 as described above with reference to the illustrative architecture 400 shown in FIG. 4.

The signal selection commands 702 allow a user to select a signal broadcast by the wireless-enabled tension meter 102. In some implementations, multiple wireless-enabled tension meters may be deployed at a job site, and so the signal selection commands 702 allow a user to select from among the available wireless-enabled tension meters. In an alternative embodiment, the signal selection commands 702 are provided as part of the operating system 122 and facilitate the selection of an SSID associated with the wireless-enabled tension meter 102 as described in greater detail above.

The navigation commands 704 allow a user to navigate the user interface 700 to access settings, menus, and the various commands, including the signal selection commands 702, the data logging commands 706, and the visual representation commands 708, and to interact with the pull data output 714 and the pull data visual representation output 716. The navigation commands 704 may be GUI elements that are selectable by a user to navigate the user interface 700. Alternatively, the navigation commands 704 are built-in to the user interface 700 such that the navigation commands 704 are not visible but understood through use, such as is the case with many touch-enabled user interfaces.

The data logging commands 706 allow a user to log pull data, export pull data, generate statistics from pull data, calculate values such as maximum tension, minimum tension, average tension, maximum speed, minimum speed, average speed, pull distance, pull midpoint, and others, tag logs based on location using location information obtained, for example, from the GPS sensor 438, and provide other functionality with regard to manipulating log files, including naming, renaming, and file conversion. In addition to the data logging commands 706, export commands may be used to email logs and/or reports generated from logs, send logs and/or reports to one or more web servers, and/or send logs and/or reports to external storage, such as a cloud-based storage solution or other storage (e.g., the removable storage 420 or external storage).

The logs and/or reports may converted to a number of formats including, but not limited to, one or more proprietary formats, comma-separated values ("CSV"), structured query language ("SQL"), portable network graphics ("PNG"), graphics interchange format ("GIF"), joint photographic experts group ("JPEG"), tagged image file format ("TIFF"), bitmap, portable document format ("PDF"), hypertext markup language ("HTML"), or any other format suitable for supporting text-based and/or graphical data associated with captured pull data.

The visual representation commands 708 allow a user to generate various visual representations for captured pull data. The visual representations may include, but are not limited to, a column chart, line chart, pie chart, bar chart, area chart, scatter plot, stock chart, surface chart, doughnut chart, bubble chart, radar chart, a representation of a conduit network through which a conductor is being pulled, any variation thereof, any combination thereof, and the like. The visual representation commands 708 allow a user to specify X-axis and Y-axis data. For example, the Y-axis may include data corresponding to the tension measured by the wireless-enabled tension meter 102 during a pull and the X-axis may include data corresponding to time of the pull or length of the pull. These examples are merely illustrative of some possible data plots that can be created using the visual representation commands 708, and as such, these examples should not be construed as being limiting in any way.

The setup commands 710 allow a user to input setup parameters. Setup parameters may include definitions of various characteristics of a linear element upon which a tension is to be exerted. The characteristics may include hardness, width, length, tensile strength, shape, maximum pull speed, and/or the like. Other characteristics are contemplated. The setup parameters may also include one or more conduit network configurations. A conduit network configuration may include a visual representation, such as a map, of a conduit network. A conduit network configuration may be presented, for example, in the pull data visual representation output 716.

The status output 712 presents status information about the wireless-enabled tension meter 102, the wireless communication device 116, the tension meter remote device 130, the feeder system 110, and/or the puller system 114. The status information may include, but is not limited to, battery level, wireless signal strength, connection types, and number of connections.

The pull data output 714 presents text-based output of captured pull data. The pull data output 714 may include raw pull data retrieved from the wireless-enabled tension meter 102 and/or calculated pull data, which may be calculated by the wireless communication device 116 and/or the wireless-enabled tension meter 102. In some implementations, the pull data output 714 presents tension, maximum tension, minimum tension, average tension, maximum speed, minimum speed, average speed, and/or pull distance in real-time during a pull. Other data may be displayed in the pull data output 714.

The pull data visual representation output 716 presents one or more visual representations such as described above. The visual representations may be generated in real-time and correspond to the real-time pull data presented in the pull data output 714. Alternatively, the pull data visual representation output 716 may present visual representations after a pull.

In some embodiments, the pull data output 714 and the pull data visual representation output 716 are presented simultaneously. In some other embodiments, the pull data output 714 and the pull data visual representation output 716 are presented individually such as one in landscape orientation and the other in portrait orientation. It is contemplated that what is presented during which orientation can be user-customizable via one or more settings.

Figure 8A:
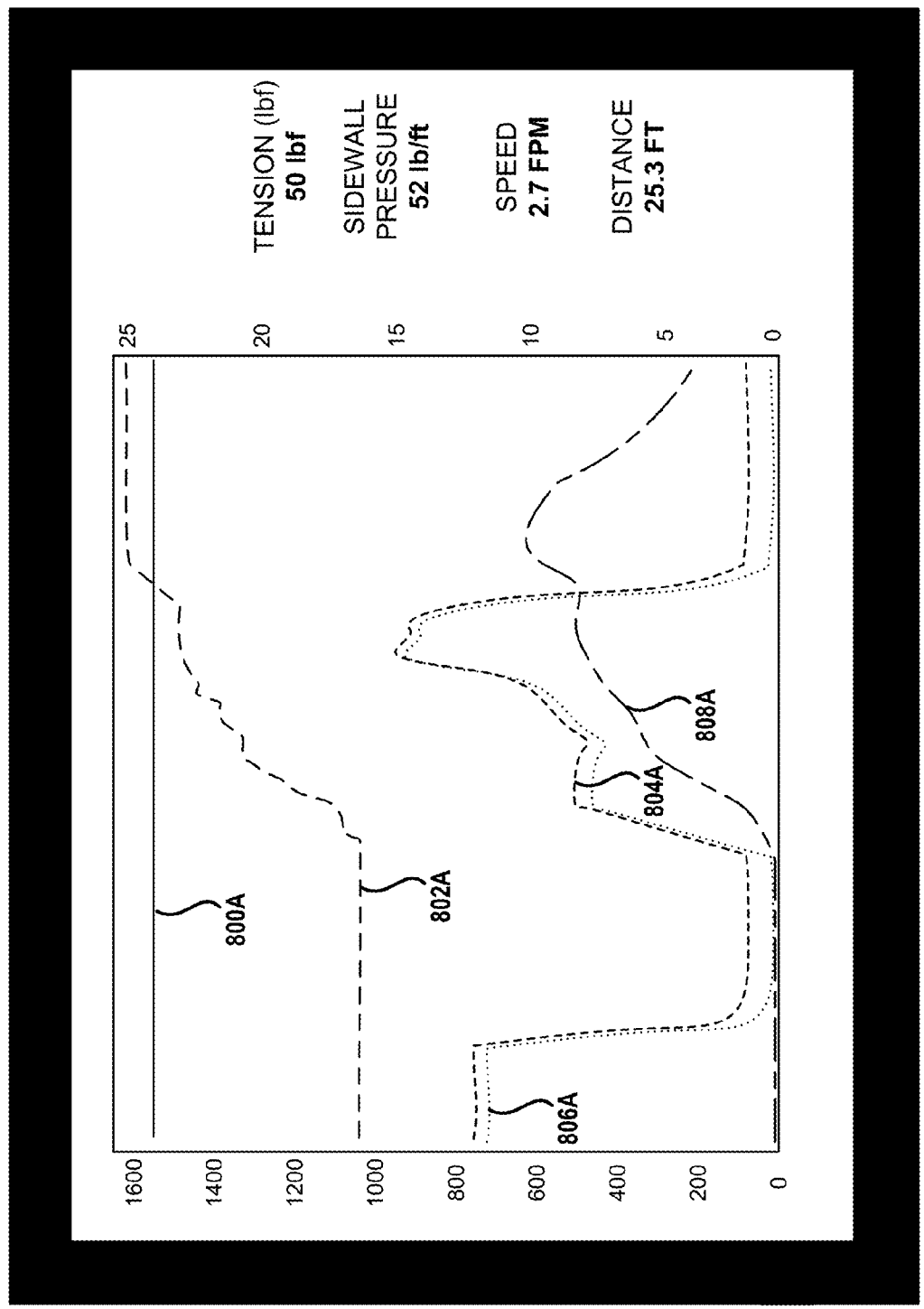
FIGS. 8A-8D show example data output, according to illustrative embodiments.
Figure 8B:
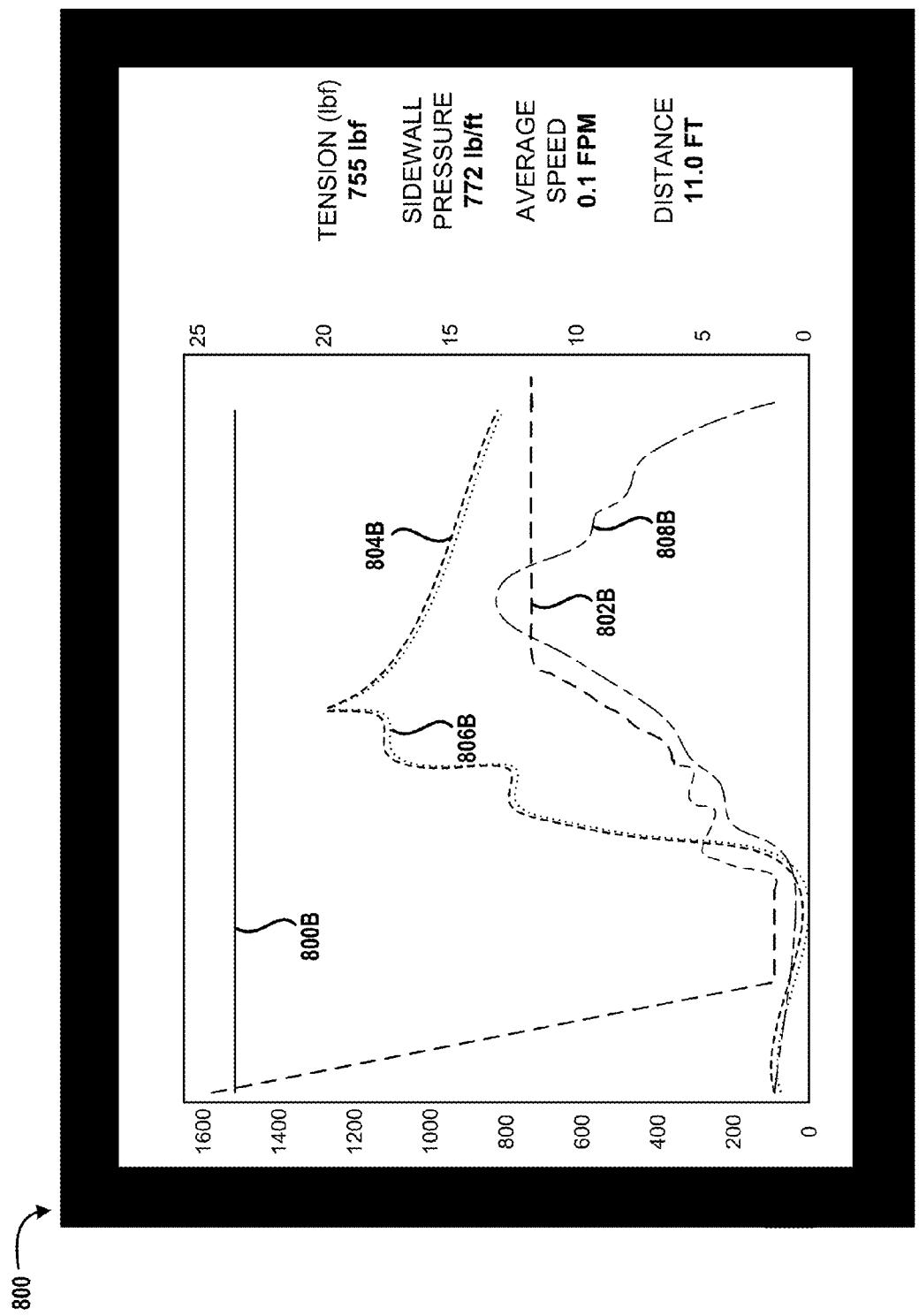
Figure 8C:
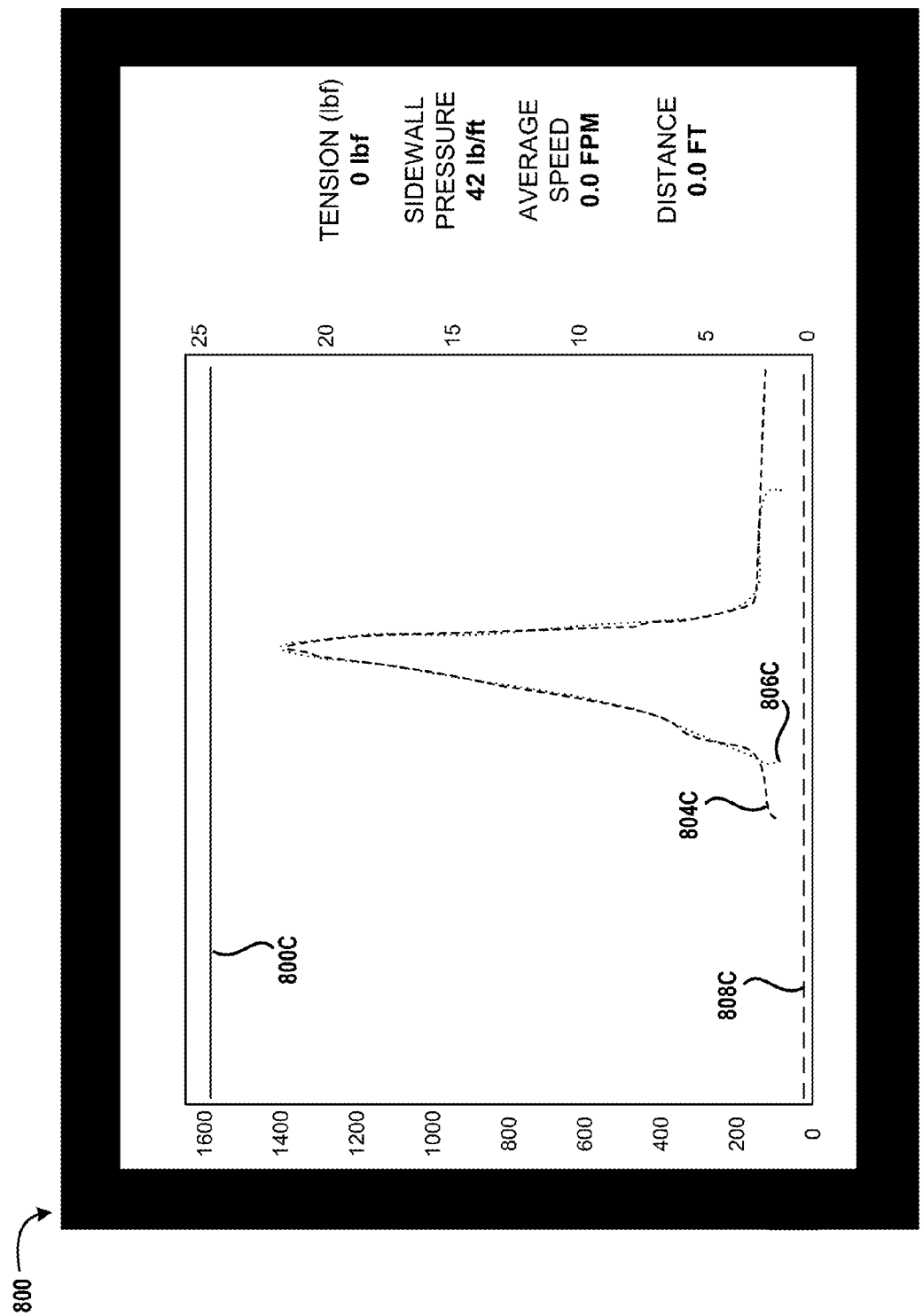

Turning now to FIGS. 8A-8C, graphs of various parameters of a pull are shown. In particular, FIG. 8A shows a tension limit 800A, a distance pulled 802A, a sidewall pressure 804A of a linear element during a pull, a tension 806A, and an average speed 808A. FIG. 8B shows a tension limit 800B, a distance pulled 802B, a sidewall pressure 804B of a linear element during a pull, a tension 806B, and an average speed 808B. FIG. 8C shows a tension limit 800C, a sidewall pressure 804C of a linear element during a pull, a tension 806C, and an average speed 808C. The sidewall pressures 804A-804C, in some embodiments, are calculated based at least in part upon the values for the tensions 806A-806C and data associated with one or more bends (e.g., bend radius) in a conduit network (e.g., the conduit network 112).

Graphs such as those shown in FIGS. 8A-8C may be provided during or after a pull, and may be provided as part of report. Although units of measurement and specific values are shown, these items may be displayed or not based upon user settings. It should be understood that the data shown in FIGS. 8A-8D is sample data, and as such, should not be construed as being limiting in any way.

Figure 8D:
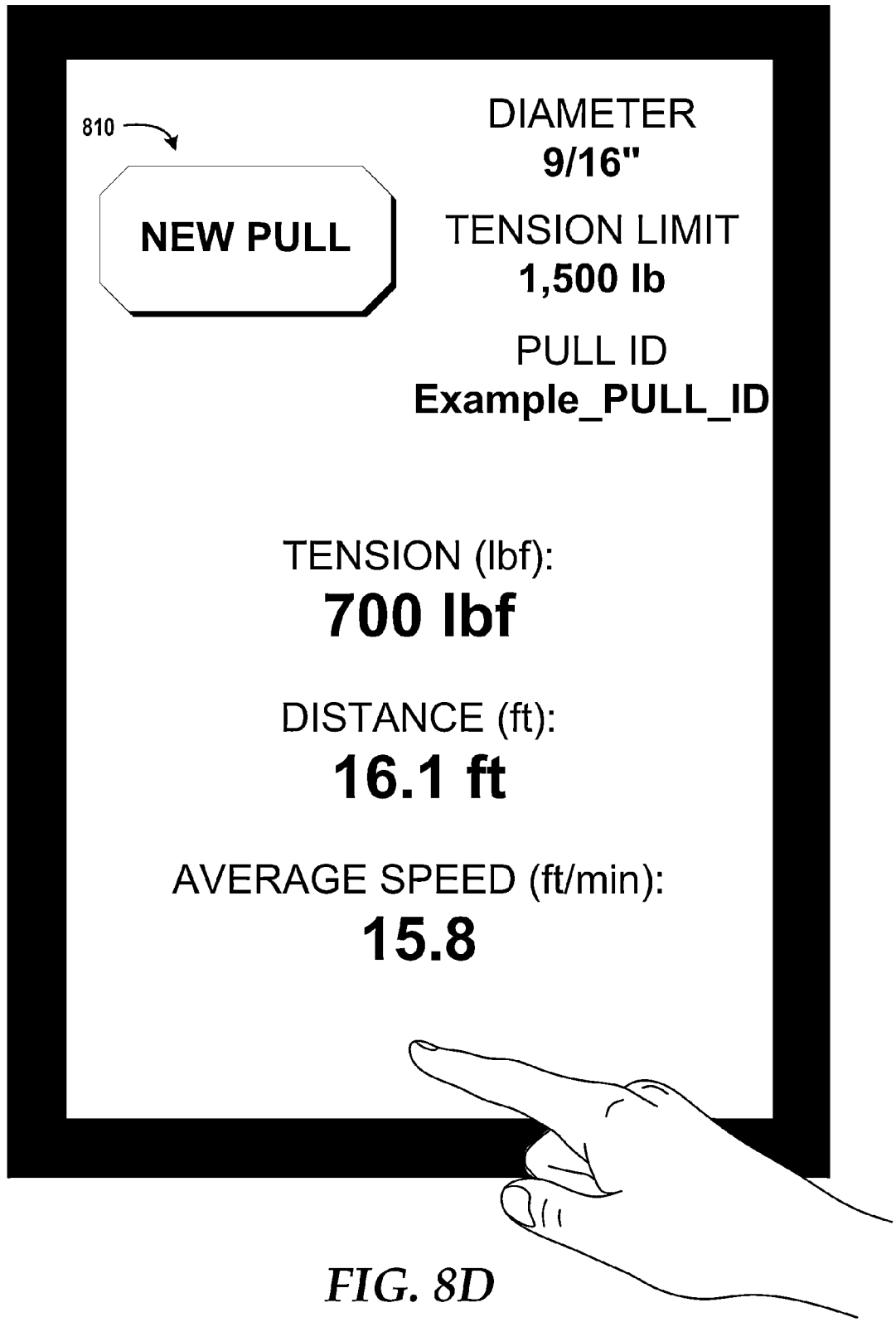

Turning now to FIG. 8D, shows an example screenshot of the pull data output 714. The illustrated example shows a tension level 810, an average speed, a distance a travelled since beginning the pull, a diameter, a user-selected tension limit, and a pull ID (e.g., assigned by a user or automatically by an application). The illustrated example as shows a "new pull" option, the selection of which may initiate a new pull.

It should be understood that the data shown in FIG. 8D is sample data, and as such, should not be construed as being limiting in any way.

Figure 9A:
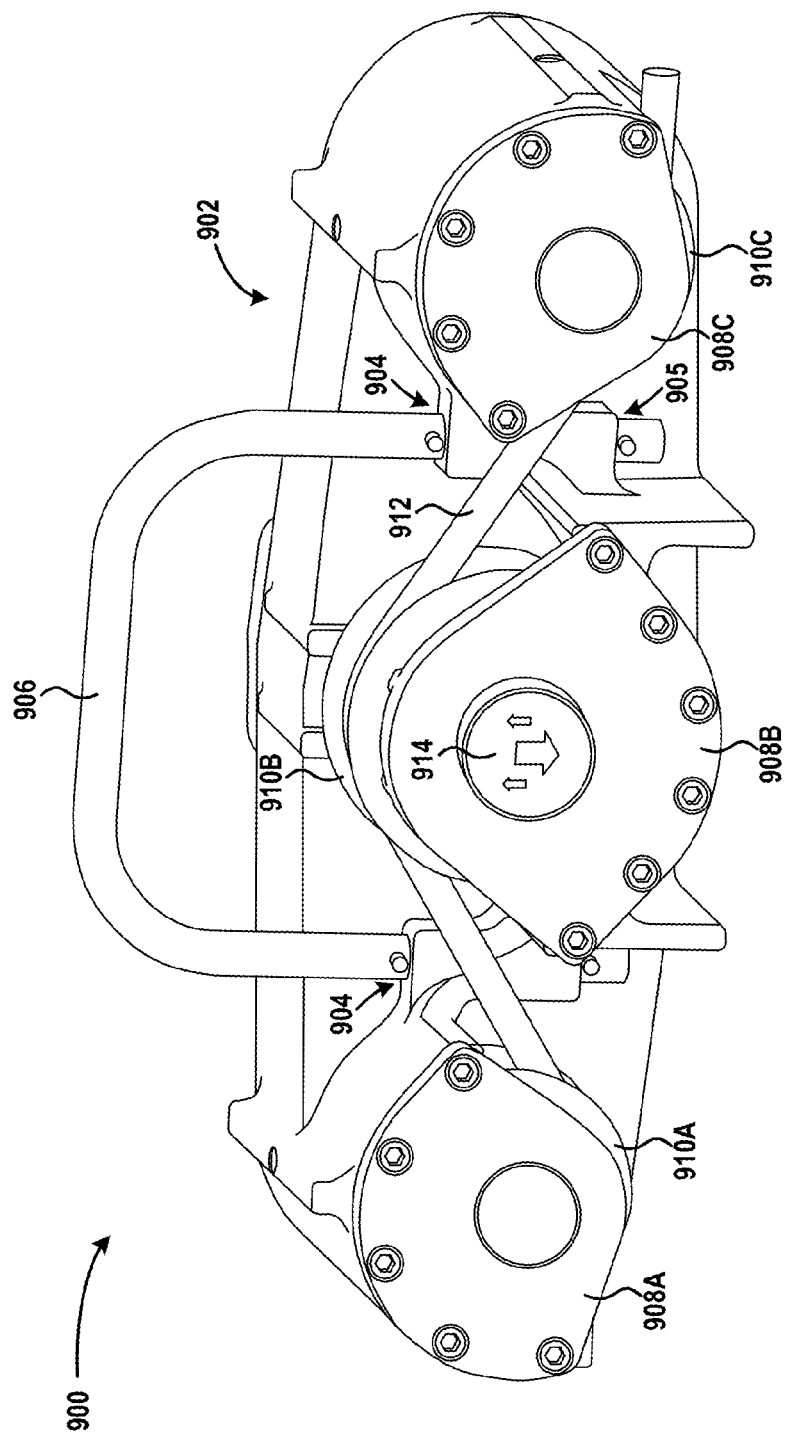
FIGS. 9A-9E are plan drawings illustrating various views of a wireless-enabled tension meter, according to an illustrative embodiment.

Turning now to FIG. 9A, a front view of an illustrative wireless-enabled tension meter 900 will be described, according to an embodiment. In some embodiments, the wireless-enabled tension meter 102 is configured the same as or as some variation of the wireless-enabled tension meter 900 shown in FIGS. 9A-9D, although alternative configurations are contemplated. The illustrated wireless-enabled tension meter 900 includes a housing 902. The housing 902 may be formed from metal, plastic, rubber, carbon composite, other materials, and/or combinations thereof. The housing 902 may include a handle receptacle 904, which is configured to secure a handle 906 to allow a user to transport the wireless-enabled tension meter 900. In the illustrated example, the handle 906 is in an "up" position. The handle 906 may be placed into a "down" position during operation, maintenance, or other reasons. The handle receptacle 904, in some embodiments, is configured to accept insertion of the handle 906 as shown. The handle receptacle 904 is configured to alternatively accept the insertion of the handle 906 from beneath the housing 902 as generally shown at 905 to allow the wireless-enabled tension meter 900 to achieve various mounting positions.

The housing 902 also includes a first pulley housing 908A, a second pulley housing 908B, and a third pulley housing 908C (referred to generally or collectively as "pulley housings" 908). The first pulley housing 908A at least partially covers a first pulley 910A. The second pulley housing 908B at least partially covers a second pulley 910B. The third pulley housing 908C at least partially covers a third pulley 910C. The first pulley 910A, the second pulley 910B, and the third pulley 910C (referred to generally or collectively as "pulleys" 910) route a guiding member 912 through the wireless-enabled tension meter 900. The pulleys 910 may be configured like the pulleys 202 described above with reference to FIG. 2. The guiding member 912 may be configured like the guiding member 108 described in FIG. 1.

The second pulley housing 908B includes an aperture (not shown) in which a load pin 914 can be inserted. The load pin 914 functions as the axis pin for the second pulley 910B and facilitates measurement of the radial force and corresponding line tension exerted on the guiding member 912 during a pull.

Figure 9B:
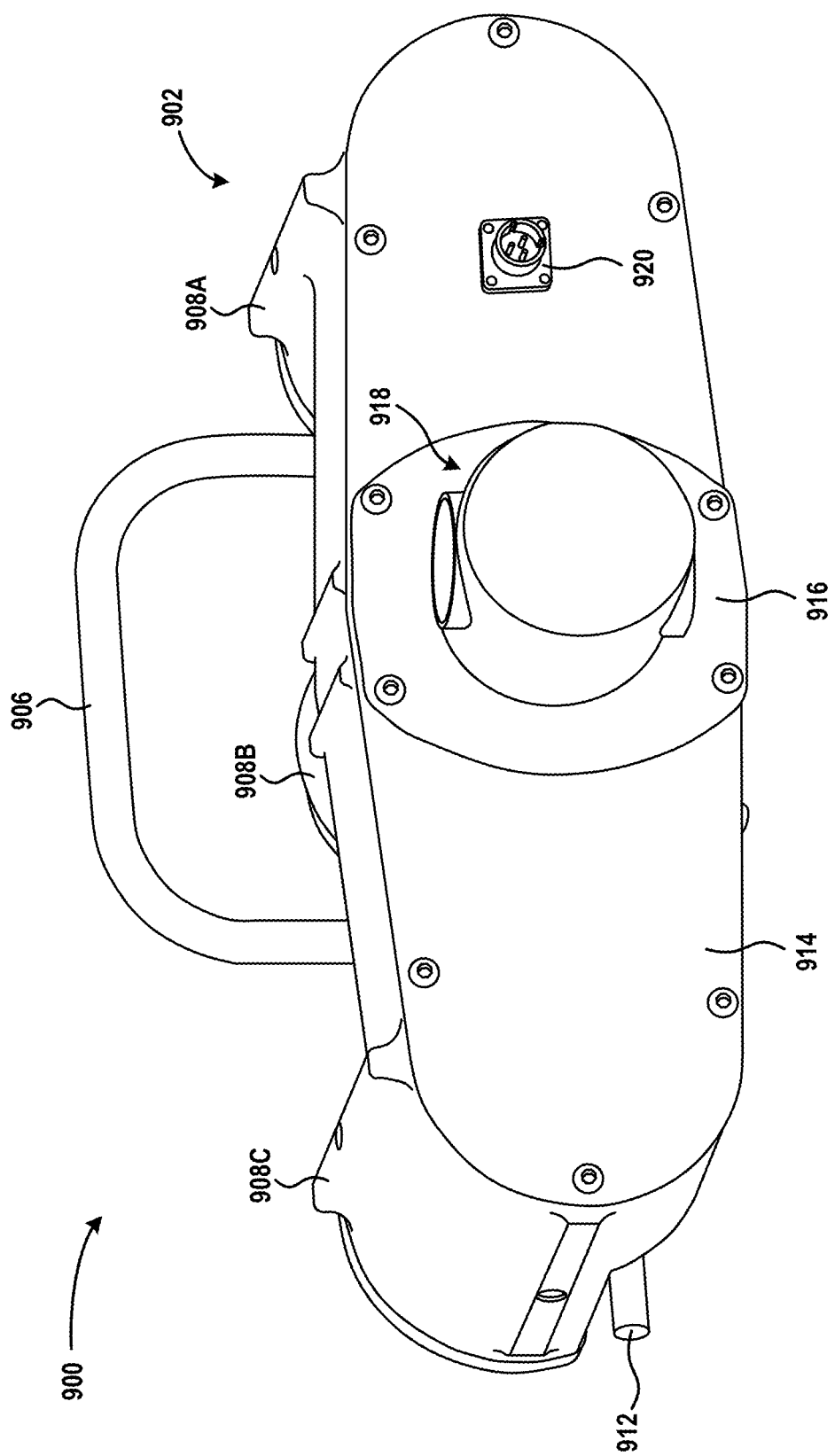

Turning now to FIG. 9B, a rear view of the illustrative wireless-enabled tension meter 900 introduced in FIG. 9A will be described. The rear view shows the housing 902, the handle 906, the pulley housings 908, and the guiding member 912 from FIG. 9A. FIG. 9B also shows a back plate 914 to which a mounting plate 916 is attached. The mounting plate 916 includes a mounting apparatus 918 to mount the wireless-enabled tension meter 900 to the ground, an object, or a system (e.g., a puller system as shown in FIG. 10). A wireless network interface connector 920 is also shown. The wireless network interface connector 920 allows a removable wireless network interface to be connected to the wireless-enabled tension meter 900. It is contemplated that the wireless network interface connector 920 may be retrofitted to the wireless-enabled tension meter 900 in some implementations.

Figure 9C:
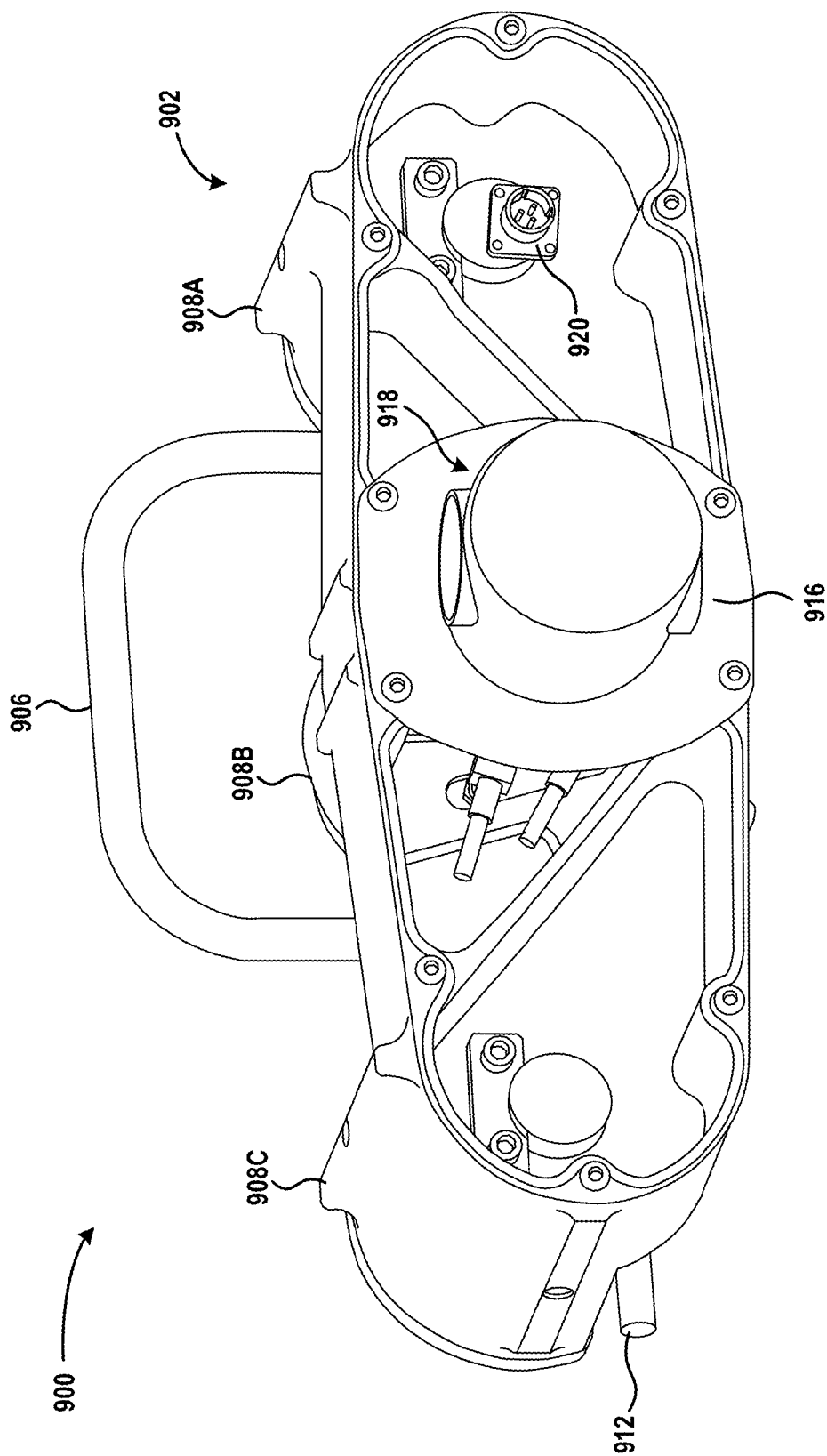
Figure 9D:
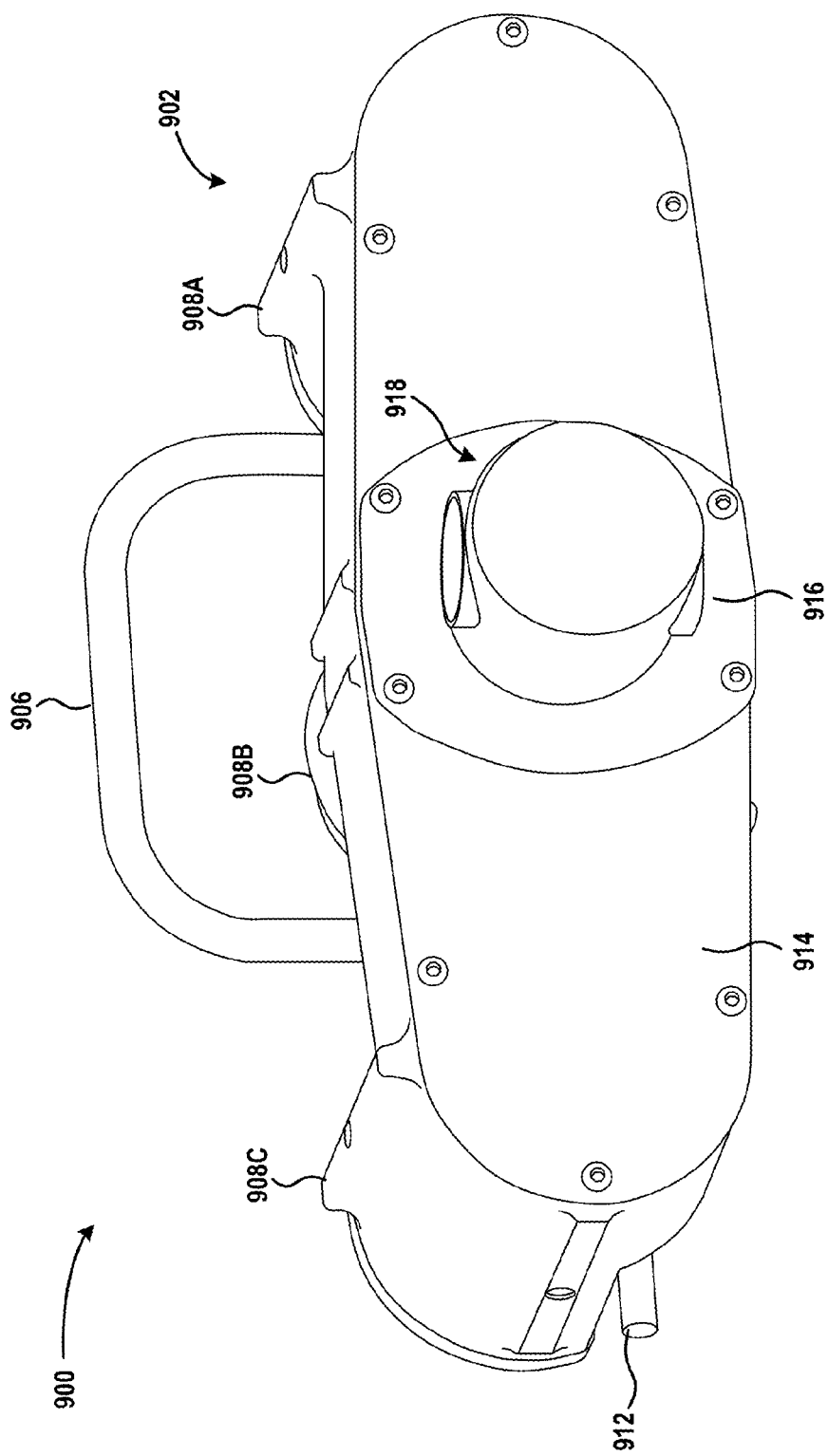
Figure 9E:
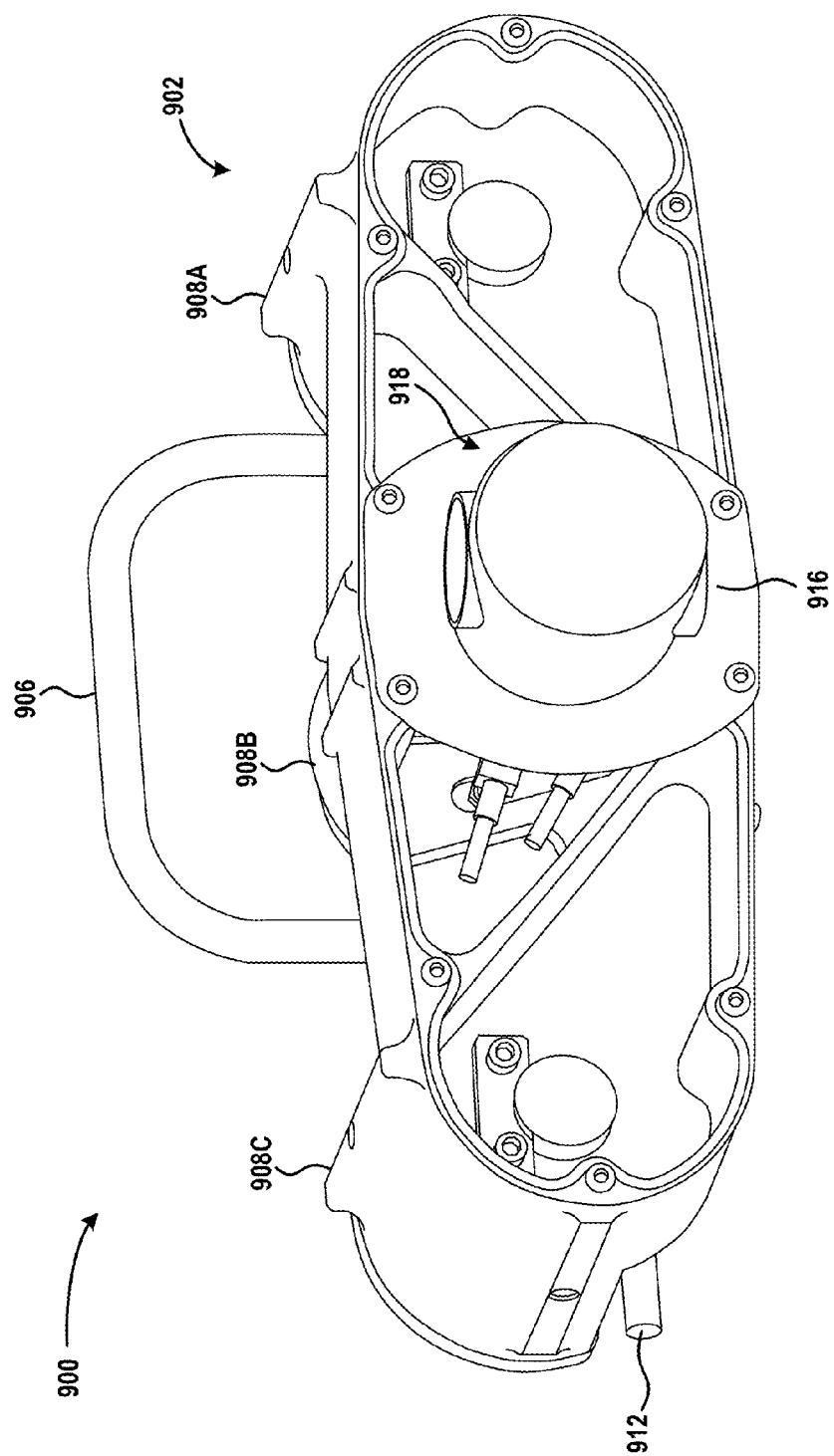

FIG. 9C shows the same elements as shown in FIG. 9B with the back plate 914 removed. FIG. 9D shows the same elements as shown in FIG. 9B except for the wireless network interface connector 920. In the example shown in FIG. 9D, the wireless-enabled tension meter 900 includes a built-in wireless network interface. FIG. 9E shows the same elements as shown in FIG. 9D with the back plate 914 removed.

Turning now to FIG. 10, a puller and tension meter system 1000 is illustrated. The puller and tension meter system 100 includes the wireless-enabled tension meter 900 mounted to a puller system 1002. In some embodiments, the puller system 114 is configured the same as or as some variation of the puller system 1002. The wireless-enabled tension meter 900 can mount to the puller system 1002 via the mounting apparatus 918 as shown or in other locations on the puller system 1002, such as on a first arm section 1004 or on a second arm section 1006. Additional details in this regard are not provided herein, although those skilled in the art will appreciate various mounting configurations conducive to the conditions of a particular deployment of the wireless-enabled tension meter 900 mounted to the puller system 1002. Accordingly, the illustrated example is provided merely for context and should not be construed as being limiting in any way.

Figure 11A:
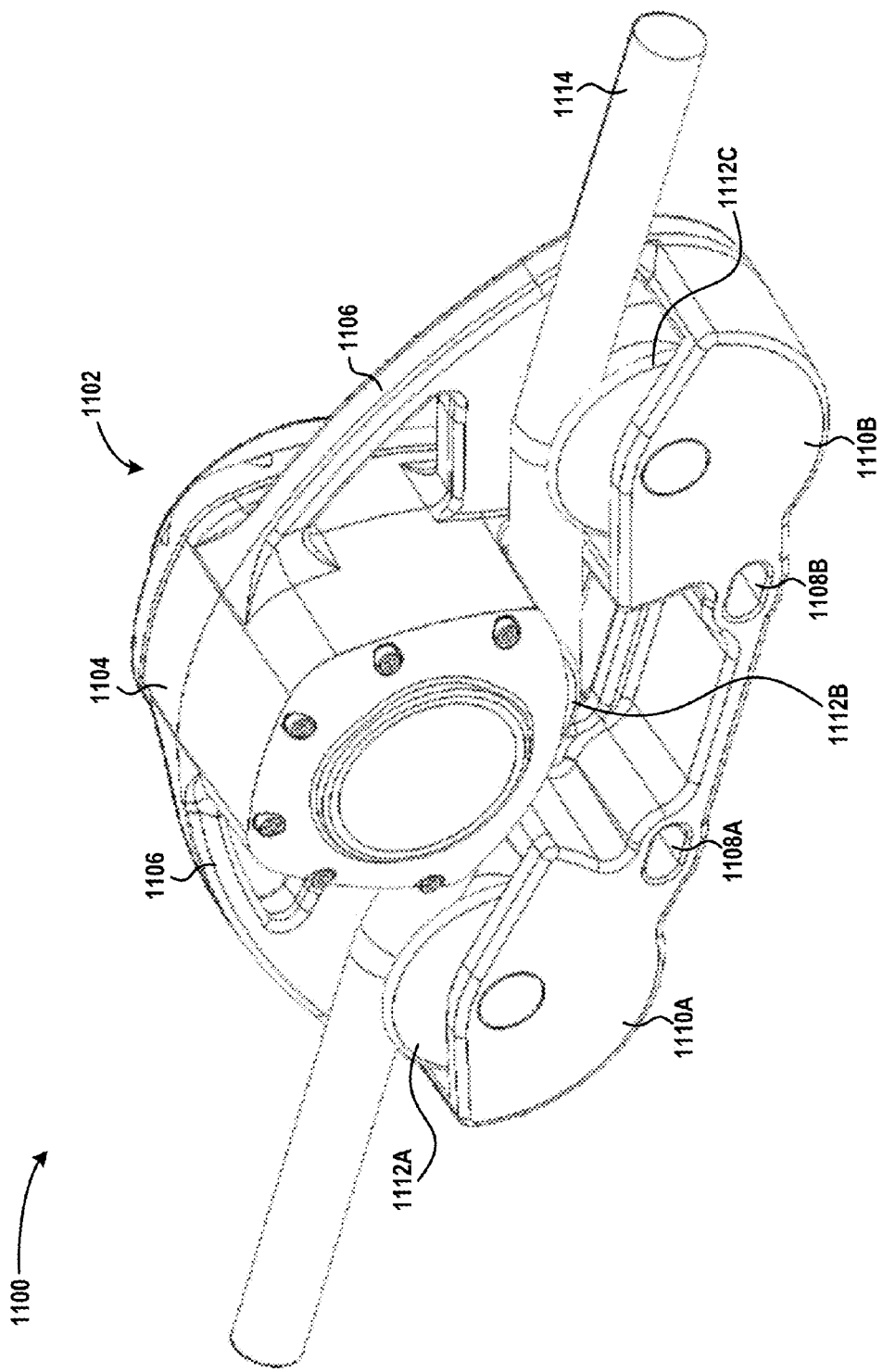
FIGS. 11A-11D are plan drawings illustrating various views of another wireless-enabled tension meter, according to an illustrative embodiment.

Turning now to FIG. 11A, a front view of an illustrative alternative wireless-enabled tension meter 1100 will be described, according to an embodiment. In some embodiments, the wireless-enabled tension meter 102 is configured the same as or as some variation of the alternative wireless-enabled tension meter 1100 shown in FIGS. 11A-11D, although alternative configurations are contemplated. The illustrated alternative wireless-enabled tension meter 1100 includes an alternative housing 1102. The alternative housing 1102 may be formed from metal, plastic, rubber, carbon composite, other materials, and/or combinations thereof The alternative housing 1102 includes a component housing 1104. The component housing 1104 may house, for example, a control module such as the control module 308 illustrated and described with reference to FIG. 3. The component housing 1104 may additionally or alternatively house the network interface 304 and/or the sensors 306 also illustrated and described with reference to FIG. 3.

The alternative housing 1102 also includes an integrated handle 1106. The integrated handle 1106 enables a user to carry the alternative wireless-enabled tension meter 1100.

The alternative housing 1102 also includes a first aperture 1108A and a second aperture 1108B (referred to generally or collectively as "apertures" 1108). The first aperture 1108A and the second aperture 1108B may be used to secure the alternative wireless-enabled tension meter 1100 to an object or plurality of objects, the ground, and/or a puller system (e.g., the puller system 114) using rope, chain, cable, another linear element, fastener(s), clasp(s), bolt(s), screw(s), and/or the like.

The alternative housing 1102 also includes a first pulley housing 1110A and a second pulley housing 1110B (referred to generally or collectively as "pulley housings" 1110). The first pulley housing 1110A at least partially covers a first pulley 1112A. The component housing 1104 at least partially covers a second pulley 1112B. The second pulley housing 1110B at least partially covers a third pulley 1112C. The first pulley 1112A, the second pulley 1112B, and the third pulley 1112C (referred to generally or collectively as "pulleys" 1112) route a guiding member 1114 through the alternative wireless-enabled tension meter 1100. The pulleys 1112 may be configured like the pulleys 202 described above with reference to FIG. 2. The guiding member 1114 may be configured like the guiding member 108 described in FIG. 1.

Figure 11B:
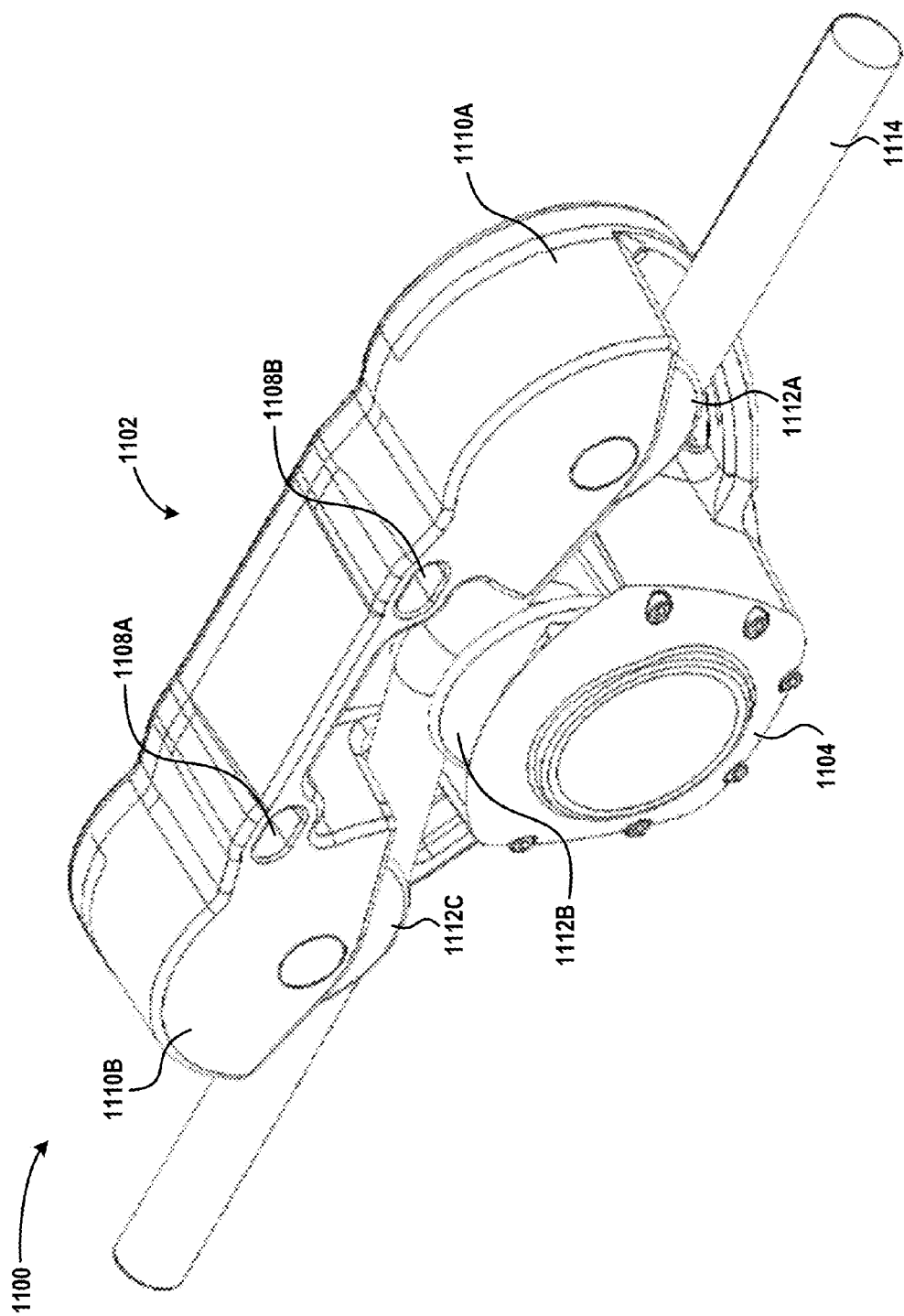

Turning now to FIG. 11B, a bottom view of the illustrative alternative wireless-enabled tension meter 1100 introduced in FIG. 11A will be described. FIG. 11B shows the alternative housing 1102, the component housing 1104, the apertures 1108, the pulley housings 1110, the pulleys 1112 and the guiding member 1114 from a bottom perspective view.

Figure 11C:
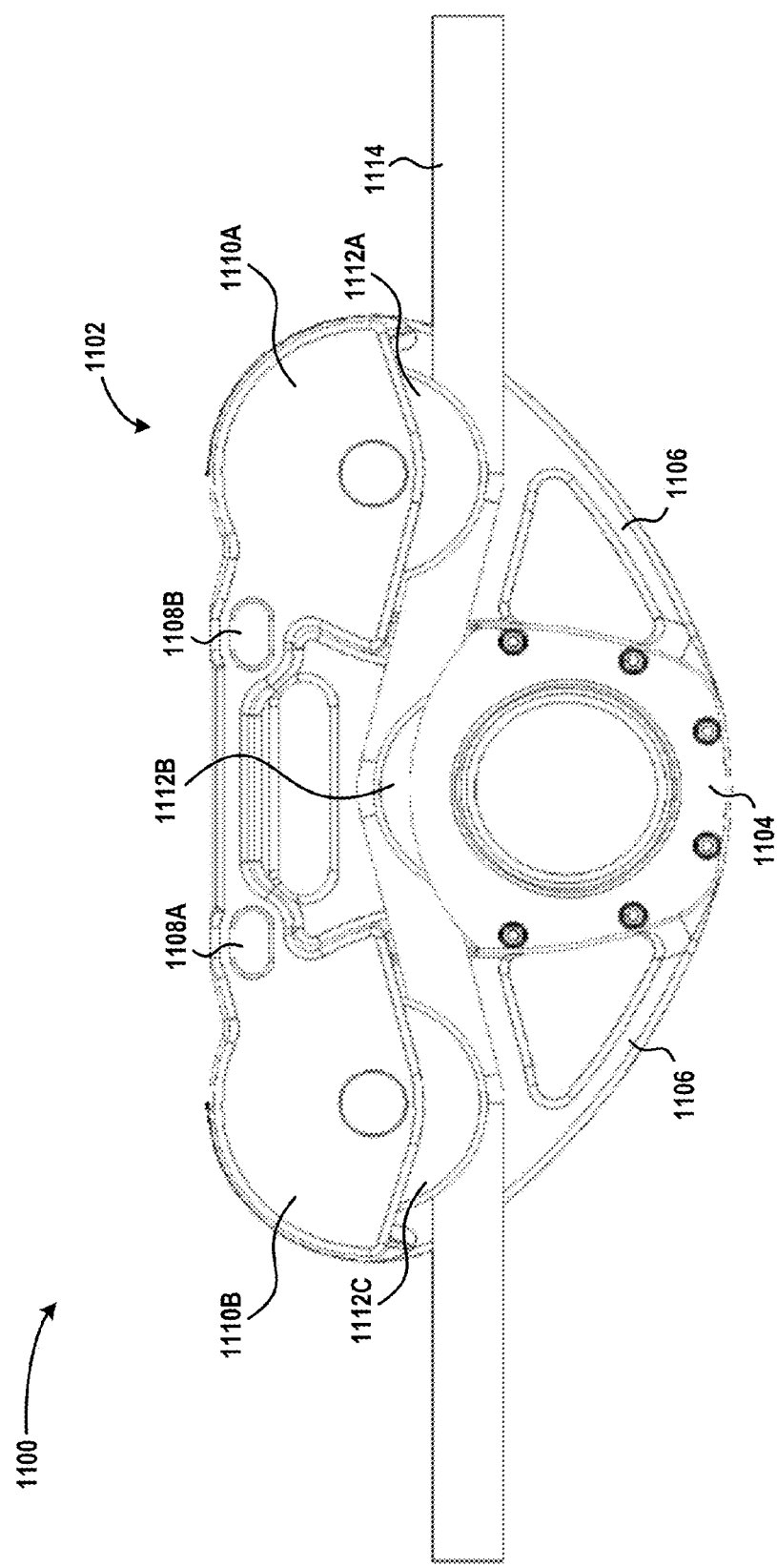

Turning now to FIG. 11C, another front view of the illustrative alternative wireless-enabled tension meter 1100 introduced in FIG. 11A will be described. FIG. 11C shows the alternative housing 1102, the component housing 1104, the integrated handle 1106, the apertures 1108, the pulley housings 1110, the pulleys 1112 and the guiding member 1114 from a front perspective view.

Figure 11D:
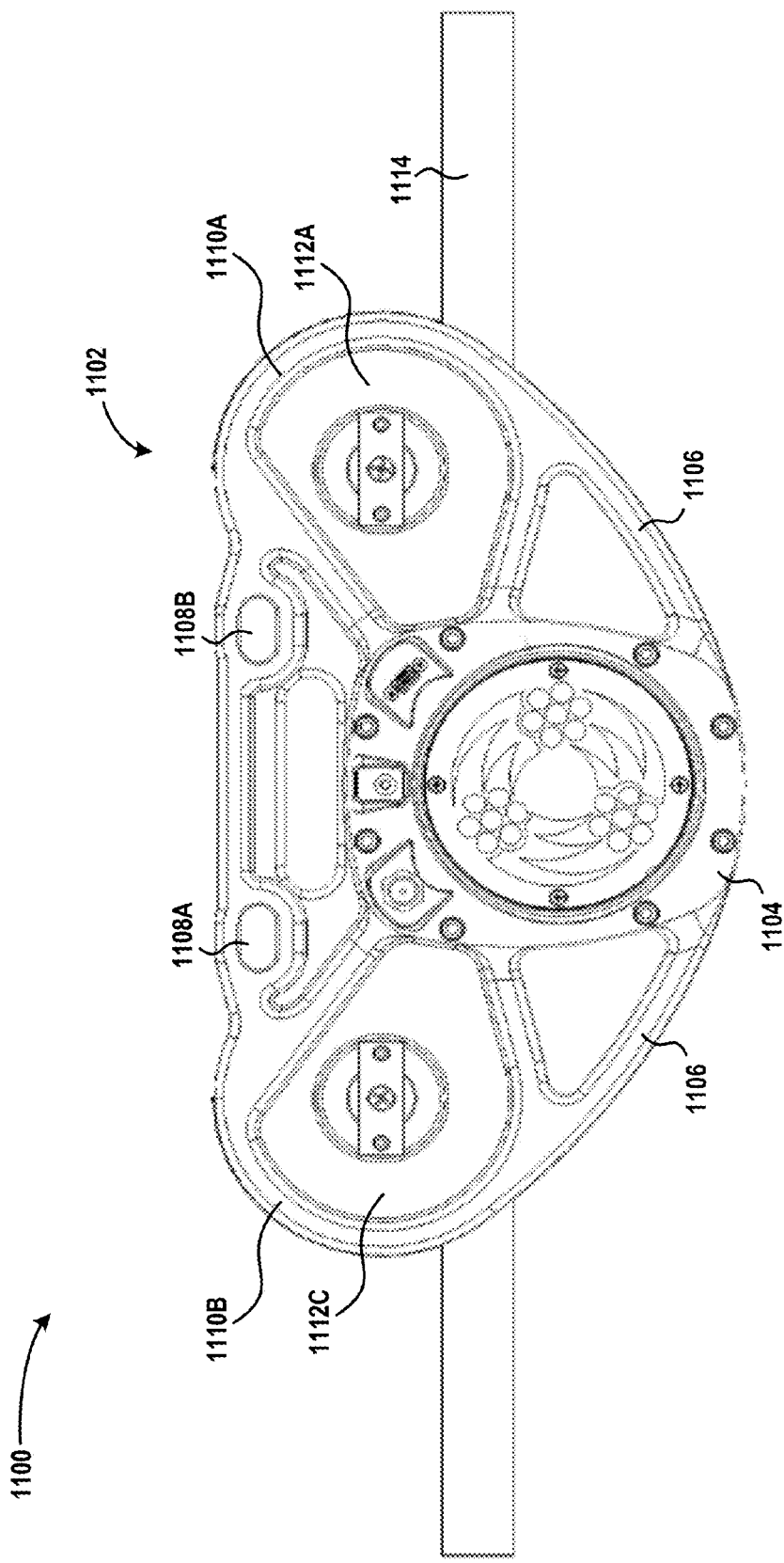

Turning now to FIG. 11D, a back view of the illustrative alternative wireless-enabled tension meter 1100 introduced in FIG. 11A will be described. FIG. 11D shows the alternative housing 1102, the component housing 1104, the apertures 1108, the pulley housings 1110, the pulleys 1112 and the guiding member 1114 from a rear perspective view.

Figure 12B:
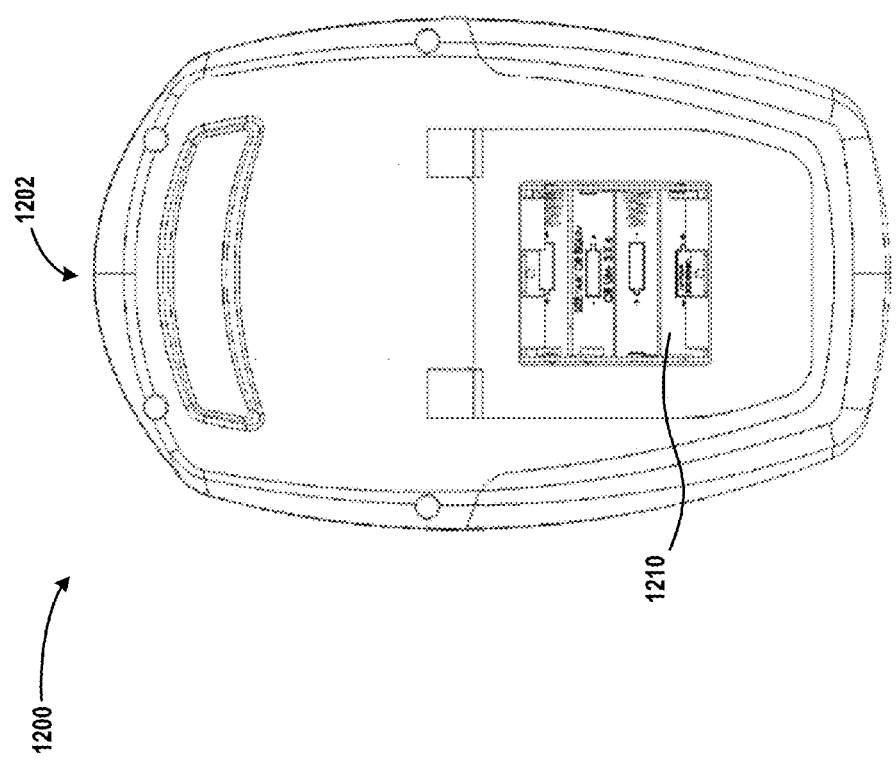

Turning now to FIGS. 12A and 12B, a wireless tension meter remote device 1200 will be described, according to an embodiment. In some embodiments, the wireless tension meter remote device 130 is configured the same as or as some variation of the wireless tension meter remote device 1200 shown in FIGS. 12A-12B, although alternative configurations are contemplated. The illustrated wireless tension meter remote device 1200 includes a remote housing 1202. The remote housing 1202 may be formed from metal, plastic, rubber, carbon composite, other materials, and/or combinations thereof.

The wireless tension meter remote device 1200 also includes a display 1204. The display 1204 may be an LCD utilizing any active or passive matrix technology and any backlighting technology (if used). In some embodiments, the display 1204 is an OLED display. Other display types are contemplated. The display 1204 can present user interface elements such as described herein above with reference to FIGS. 7, 8A, and 8B.

The wireless tension meter remote device 1200 also includes a power button 1206. The power button 1206 may be a push-button, capacitive button, toggle switch, or the like. The power button 1206 may include an indicator light, such as an LED, to indicate when the wireless tension meter remote device 1200 is powered on.

The wireless tension meter remote device 1200 also includes a keypad 1208. The keypad 1208 allows a user to control the operation of the wireless tension meter remote device 1200. Although the keypad 1208 is shown as a directional pad, other configurations are contemplated and will be appreciated by those skilled in the art. The wireless tension meter remote device 1200 may additionally or alternatively include a touchscreen separate from and/or built-in to the display 1204. The touchscreen may support single touch, multi-touch, and/or gestures. Voice control, motion control, and other natural user interface controls are also contemplated.

As shown in FIG. 12B, the remote housing 1202 includes a battery compartment 1210. In the illustrated embodiment, the battery component 1210 is configured to receive four batteries for powering the wireless tension meter remote device 1200, although the battery component 1210 may be configured to receive more or less batteries. Further, the battery component 1210 may be built-in to the remote housing 1202 such that the batteries are not user-replaceable.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A wireless-enabled tension meter comprising:
   a pulley arrangement through which a guiding member for use during a pull of a conductor through a conduit network is routed, wherein the guiding member is attached to the conductor, and wherein a tension force is exerted on the guiding member as the guiding member traverses the pulley arrangement;
   a sensor for measuring the tension force, wherein the sensor comprises a load pin that functions as an axis for a pulley of the pulley arrangement, the load pin facilitates measurement of a radial force exerted on the pulley by the guiding member as the guiding member traverses the pulley arrangement, and the radial force is utilized to calculate the tension force;
   a wireless network interface; and
   a control module that performs operations comprising capturing data corresponding to the tension force, and causing the wireless network interface to send the data to a device.

2. The wireless-enabled tension meter of claim 1, further comprising a display; and wherein the operations further comprise presenting the data on the display.

3. The wireless-enabled tension meter of claim 1, wherein the device comprises a wireless communication device.

4. The wireless-enabled tension meter of claim 1, wherein the device comprises a tension meter remote device.

5. The wireless-enabled tension meter of claim 1, wherein the operations further comprise causing the wireless network interface to broadcast a wireless signal that is detectable by the device.

6. The wireless-enabled tension meter of claim 5, wherein the wireless signal is a WI-FI signal utilized to create a peer-to-peer connection between the wireless network interface and the device.

7. The wireless-enabled tension meter of claim 5, wherein the wireless signal comprises a service set identification ("SSID") unique to the wireless-enabled tension meter.

8. The wireless-enabled tension meter of claim 5, wherein the wireless signal comprises a short-range wireless signal.

9. The wireless-enabled tension meter of claim 1, wherein the operations further comprise causing the wireless network interface to connect to a wireless network; and wherein causing the wireless network interface to send the data to the device comprises causing the wireless network interface to send the data to the device via the wireless network.

10. The wireless-enabled tension meter of claim 1, wherein the operations further comprise:
    hosting a web application comprising a user interface through which commands can be provided to the wireless-enabled tension meter;
    providing the web application to the device via the wireless network interface; and
    receiving a command from the device via the wireless network interface, wherein the command is selected from the user interface presented on the device.

11. The wireless-enabled tension meter of claim 10, wherein the command comprises a request to measure the tension force.

12. The wireless-enabled tension meter of claim 11, wherein the command further comprises a request to measure a metric comprising at least one of the tension force, a length of the pull, a position of the conductor in the conduit network, or a speed of the pull.

13. The wireless-enabled tension meter of claim 1, wherein the data is utilized to calculate a sidewall pressure of the conductor.

14. A computer storage medium storing computer-executable instructions which, when executed by a processor of a wireless-enabled tension meter, cause the wireless-enabled tension meter to perform operations comprising:
capturing data from a sensor, the data corresponding to a tension force exerted by a puller system on a guiding member during a pull of a conductor through a conduit network; and
sending the data to a wireless communication device via a wireless network, wherein the data is utilized to calculate a sidewall pressure of the conductor.

15. The computer storage medium of claim 14, wherein the operations further comprise hosting a web application that is accessible by the wireless communication device via the wireless network, the web application providing a user interface through which a user can control functions of the wireless-enabled tension meter.

16. The computer storage medium of claim 15, wherein the functions comprise requesting the wireless-enabled tension meter to capture the data.

17. The computer storage medium of claim 14, wherein the data further comprises at least one of a length of the pull, a position of the conductor in the conduit network, or a speed of the pull.

18. The computer storage medium of claim 15, wherein the functions further comprise manipulating the data.

19. The computer storage medium of claim 18, wherein the data further comprises at least one of a length of the pull, a position of the conductor in the conduit network, or a speed of the pull.

20. The computer storage medium of claim 14, wherein sending the data to the wireless communication device via the wireless network comprises sending the data to an application executing on the wireless communication device.

21. A wireless-enabled tension meter comprising:
a pulley arrangement through which a guiding member for use during a pull of a conductor through a conduit network is routed, wherein the guiding member is attached to the conductor, and wherein a tension force is exerted on the guiding member as the guiding member traverses the pulley arrangement;
a sensor for measuring the tension force;
a wireless network interface; and
a control module that performs operations comprising capturing data corresponding to the tension force, causing the wireless network interface to send the data to a device,
hosting a web application comprising a user interface through which commands can be provided to the wireless-enabled tension meter,
providing the web application to the device via the wireless network interface, and
receiving a command from the device via the wireless network interface, wherein the command is selected from the user interface presented on the device.

22. The wireless-enabled tension meter of claim 21, wherein the command comprises a request to measure a metric associated with the pull.

23. The wireless-enabled tension meter of claim 22, wherein the metric comprises a speed of the pull.

24. The wireless-enabled tension meter of claim 22, wherein the metric comprises a length of the pull.

25. The wireless-enabled tension meter of claim 21, wherein the command comprises a navigation command.

26. The wireless-enabled tension meter of claim 21, wherein the command comprises a data logging command.

27. The wireless-enabled tension meter of claim 26, wherein the data logging command comprises a log pull data command.

28. The wireless-enabled tension meter of claim 26, wherein the data logging command comprises an export log pull data command.

29. The wireless-enabled tension meter of claim 26, wherein the data logging command comprises a location tag command.

30. The wireless-enabled tension meter of claim 21, wherein the command comprises a visual representation command.

31. The wireless-enabled tension meter of claim 21, wherein the command comprises a setup command.

32. The wireless-enabled tension meter of claim 21, wherein the user interface further comprises a status output element.

33. The wireless-enabled tension meter of claim 21, wherein the user interface further comprises a pull data output element.

34. The wireless-enabled tension meter of claim 21, wherein the user interface further comprises a pull data visual representation.

35. The wireless-enabled tension meter of claim 21, wherein the data further comprises at least one of a length of the pull, a position of the conductor in the conduit network, or a speed of the pull.

36. The wireless-enabled tension meter of claim 35, wherein the operations further comprise manipulating the data in response to the command.

37. The wireless-enabled tension meter of claim 21, wherein the device comprises a wireless communication device or a tension meter remote device.

* * * * *